United States Patent
Izuhara et al.

(10) Patent No.: US 10,224,562 B2
(45) Date of Patent: Mar. 5, 2019

(54) METHOD FOR PRODUCING POLYMER ELECTROLYTE MOLDED ARTICLE, POLYMER ELECTROLYTE MATERIAL, POLYMER ELECTROLYTE MEMBRANE, AND POLYMER ELECTROLYTE FUEL CELL

(71) Applicant: TORAY INDUSTRIES, INC., Tokyo (JP)

(72) Inventors: Daisuke Izuhara, Kyoto (JP); Hiroshi Taiko, Shiga (JP); Yuriko Okada, Osaka (JP); Shinya Adachi, Shiga (JP); Masataka Nakamura, Chiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 812 days.

(21) Appl. No.: 14/664,598

(22) Filed: Mar. 20, 2015

(65) Prior Publication Data
US 2015/0200413 A1   Jul. 16, 2015

Related U.S. Application Data

(62) Division of application No. 11/815,737, filed as application No. PCT/JP2006/302481 on Feb. 14, 2006, now Pat. No. 8,986,903.

(30) Foreign Application Priority Data

Feb. 15, 2005 (JP) .................................. 2005-037272
Jul. 29, 2005 (JP) .................................. 2005-220173

(51) Int. Cl.
*H01M 8/10*   (2016.01)
*H01M 8/1041*   (2016.01)
(Continued)

(52) U.S. Cl.
CPC ...... *H01M 8/1041* (2013.01); *C08G 65/4056* (2013.01); *C08J 5/2256* (2013.01);
(Continued)

(58) Field of Classification Search
CPC ............. H01M 8/1041; H01M 8/1025; H01M 8/1088; H01M 8/1072; H01M 8/04197;
(Continued)

(56) References Cited

U.S. PATENT DOCUMENTS 7,202,001 B2 * 4/2007 Cao .................... B01D 67/0088
429/314
7,351,775 B2 * 4/2008 Maier ................ B01D 67/0009
525/535

(Continued)

FOREIGN PATENT DOCUMENTS

JP       2004 234931     8/2004
WO      WO 01/70857      9/2001
WO      WO 01/70858      9/2001

OTHER PUBLICATIONS

EP Search Report issued in regard to European Patent Application 12156685,5 dated May 8, 2015.

*Primary Examiner* — Lisa S Park
(74) *Attorney, Agent, or Firm* — Pillsbury Winthrop Shaw Pittman LLP

(57) ABSTRACT

The present invention relates to a method for producing a polymer electrolyte molded article, which comprises forming a polymer electrolyte precursor having a protective group and an ionic group, and deprotecting at least a portion of protective groups contained in the resulting molded article to obtain a polymer electrolyte molded article. According to the present invention, it is possible to obtain a polymer electrolyte material and a polymer electrolyte molded article, which are excellent in proton conductivity and are also excellent in fuel barrier properties, mechanical (Continued)

strength, physical durability, resistance to hot water, resistance to hot methanol, processability and chemical stability. A polymer electrolyte fuel cell using a polymer electrolyte membrane, polymer electrolyte parts or a membrane electrode assembly can achieve high output, high energy density and long-term durability.

5 Claims, 1 Drawing Sheet

(51) Int. Cl.
| | |
|---|---|
| C08G 65/40 | (2006.01) |
| C08J 5/22 | (2006.01) |
| H01B 1/12 | (2006.01) |
| H01M 8/1025 | (2016.01) |
| H01M 8/1072 | (2016.01) |
| H01M 8/1088 | (2016.01) |
| H01M 8/1018 | (2016.01) |
| H01M 8/04082 | (2016.01) |

(52) U.S. Cl.
CPC .......... *H01B 1/122* (2013.01); *H01M 8/1025* (2013.01); *H01M 8/1072* (2013.01); *H01M 8/1088* (2013.01); *C08J 2371/12* (2013.01); *H01M 8/04197* (2016.02); *H01M 2008/1095* (2013.01); *H01M 2300/0082* (2013.01); *Y02E 60/523* (2013.01); *Y02P 20/582* (2015.11); *Y02P 70/56* (2015.11)

(58) Field of Classification Search
CPC .. H01M 2008/1095; H01M 2300/0082; C08G 65/4056; H01B 1/122; C08J 5/2256; C08J 2371/12; Y02P 20/582; Y02P 70/56; Y02E 60/523
See application file for complete search history.

(56) References Cited

U.S. PATENT DOCUMENTS 7,405,015 B2 * 7/2008 Xiao ...................... C08J 5/2256
429/481
2006/0180796 A1 * 8/2006 Adachi .................... C09K 5/20
252/500

* cited by examiner

METHOD FOR PRODUCING POLYMER ELECTROLYTE MOLDED ARTICLE, POLYMER ELECTROLYTE MATERIAL, POLYMER ELECTROLYTE MEMBRANE, AND POLYMER ELECTROLYTE FUEL CELL

RELATED CASE INFORMATION

This application is a Continuation of U.S. application Ser. No. 11/815,737 filed Aug. 8, 2007 which is a U.S. National Phase of PCT International Application No. PCT/JP2006/302481, both of which are incorporated herein in their entirety by reference. The PCT application published in Japanese as WO2006/087995 A1.

TECHNICAL FIELD

The present invention relates to a method for producing a polymer electrolyte molded article, a polymer electrolyte material, a polymer electrolyte membrane, and polymer electrolyte parts, a membrane electrode assembly and a polymer electrolyte fuel cell, each using the same.

BACKGROUND ART

A fuel cell is a kind of power generator capable of generating electric energy by electrochemically oxidizing a fuel such as hydrogen or methanol, and an intense interest has been shown towards the fuel cell, as a clean energy supply source, recently. Particularly, it is expected that a polymer electrolyte fuel cell is widely used as a distributed power generation facility of comparatively small scale, and a power generator of mobile bodies such as automobile and marine vessel, because of such high standard operation temperature as about 100° C. and high energy density. Also, an intense interest has been shown towards the polymer electrolyte fuel cell as a power supply of a portable mobile equipment and a portable device, and it is expected to install the polymer electrolyte fuel cell in a cellular phone and a personal computer in place of a secondary cell such as nickel-hydrogen cell or lithium ion cell.

In the polymer electrolyte fuel cell, an intense interest has been shown towards a direct methanol type fuel cell in which metal is directly supplied as a fuel (hereinafter, referred to as DMFC), in addition to a conventional polymer electrolyte fuel cell in which a hydrogen gas is used as a fuel (hereinafter, referred to as PEFC). DMFC has such an advantage that the fuel is liquid and no reformer is used and, therefore, energy density increases and an operating time per one filling of the portable device increases.

In the fuel cell, anode and cathode electrodes in which the reaction capable of generating electricity, and a polymer electrolyte membrane serving as a proton conductor between an anode and a cathode form a membrane electrode assembly (hereinafter abbreviated to MEA) and a cell comprising separators and MEA-interposed between the separators is formed as a unit.

As required properties of the polymer electrolyte membrane, high proton conductivity is exemplified, first. Also, since the polymer electrolyte membrane functions as a barrier which prevents a direct reaction between a fuel and oxygen, low permeability is required to the fuel. Particularly, in a polymer electrolyte membrane for DMFC in which an organic solvent such as methanol is used as the fuel, methanol penetration is referred to as methanol crossover (hereinafter sometimes abbreviated to MCO) and causes a problem such as decrease in cell output and energy efficiency. As other required properties, resistance to solvents is also an important property in DMFC in which a high concentration fuel such as methanol is used, in view of long-term durability against the high concentration fuel. Other required properties include chemical stability for enduring a strong atmosphere during operation of a fuel cell, and mechanical strength and physical durability for enduring thinning and repetition of swelling and drying.

As the material of the polymer electrolyte membrane, NAFION® (manufactured by DuPont Co.) as a perfluorosulfonic acid-based polymer has widely been used. Although NAFION has nearly good balanced properties suited for use as the polymer electrolyte membrane, further improvement is required as the cell is popularly put into practical use. NAFION® is very expensive because it is prepared through multi-stage synthesis, and also has a problem that fuel crossover is large because a cluster structure is formed. Also, there were problems that mechanical strength and physical durability of the membrane formed by swelling and drying are lost because of poor resistance to hot water and poor resistance to hot methanol, and that it cannot be used at high temperature because of low softening point, and a problem such as waste disposal after use and a problem that it is difficult to recycle the material.

To solve these problems, some studies on a polymer electrolyte material containing a hydrocarbon-based polymer of a nonperfluoro-based polymer as a base have been made. As a polymer skeleton, particularly intensive study on an aromatic polyether ketone and an aromatic polyethersulfone has been made in view of heat resistance and chemical stability.

For example, there have been proposed a sulfonated compound of a slight soluble aromatic polyetherether ketone (see, for example, non-patent document 1), polysulfone in a narrow sense as an aromatic polyethersulfone (hereinafter sometimes abbreviated to PSF) and a sulfonated compound of polyethersulfone (hereinafter sometimes abbreviated to PES) in a narrow sense (see, for example, non-patent document 2). However, there was a problem that, when the content of an ionic group increases so as to enhance proton conductivity, the membrane thus formed swells, resulting in large crossover of the fuel such as methanol. Also, there was a problem that the membrane thus formed is insufficient in mechanical strength and physical durability because of low cohesive force of polymer molecular chains.

Also, a sulfonated compound of an aromatic polyether ketone (hereinafter abbreviated to PEK) was proposed (see, for example, patent document 1 and 2). However, there was a problem that, because of its high crystallinity, in case of the composition of low density of a sulfonic acid group, the remained crystal is insoluble in a solvent, resulting in poor processability. To the contrary, when the density of the sulfonic acid group increases so as to enhance processability, the polymer is not crystalline and drastically swells in water and, therefore, the membrane thus formed shows large fuel crossover and is insufficient in strength.

As a method of controlling an amount of the sulfonic acid group in an aromatic polyethersulfone-based material, there is reported a sulfonated aromatic polyethersulfone in which a monomer having a sulfonic acid group introduced therein is polymerized and an amount of a sulfonic acid group is controlled (see, for example, patent document 3). However, a problem such as swelling of a membrane formed at high temperature and high humidity is not solved by this technique. Particularly, in an aqueous solution of a fuel such as methanol, or in case of the composition of high density of a sulfonic acid group, there is remarkable tendency of swelling of the membrane. In a polymer electrolyte membrane which is inferior in resistance to hot water and resistance to hot methanol, it was difficult to sufficiently control crossover of the fuel such as methanol and to impart mechanical strength and physical durability which can endure a swelling and drying cycle.

As described above, the polymer electrolyte material of the prior art was insufficient in means for improving economical efficiency, processability, proton conductivity, fuel crossover, resistance to solvents, mechanical strength, physical durability and long-term durability, and there has never been obtained an industrially useful polymer electrolyte material for fuel cell.

non-patent document 1: "Polymer", 1987, vol. 28, 1009 non-patent document 2: Journal of Membrane Science, 83 (1993) 211-220 patent document 1: Japanese Unexamined Patent Publication (Kokai) No. 6-93114 patent document 2: Published Japanese Translation No. 2004-528683 of the PCT Application patent document 3: U.S. Patent No. 2002/0091225.

DISCLOSURE OF THE INVENTION

An object of the present invention is to provide a polymer electrolyte material which is excellent in proton conductivity and is also excellent in fuel barrier properties, mechanical strength, physical durability, resistance to hot water, resistance to hot methanol, processability and chemical stability, and a method for producing a polymer electrolyte molded article. Also, the present invention provides a polymer electrolyte membrane, polymer electrolyte parts, a membrane electrode assembly and a polymer electrolyte fuel cell, each using the same.

The present invention employs the following means so as to achieve the above object.

First means is a method for producing a polymer electrolyte molded article, which comprises forming a polymer electrolyte precursor having a protective group and an ionic group, and deprotecting at least a portion of protective groups contained in the resulting molded article to obtain a polymer electrolyte molded article.

Also, second means is a polymer electrolyte material containing an ionic group-containing polymer in which a crystallization peak is recognized by the measurement of temperature modulation differential scanning calorimetry.

Third means is a polymer electrolyte material which contains at least an ionic group-containing polymer including constituent units represented by the following general formulas (Q1) and (Q3) and also a molar content of constituent units represented by the general formulas (Q1), (Q2) and (Q3) satisfies the following formula (S1):

[Chemical Formula 1]

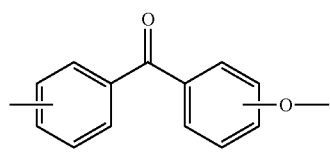
(Q1)

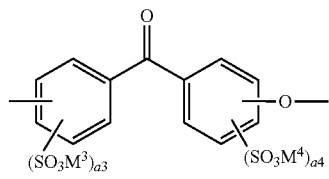
(Q2)

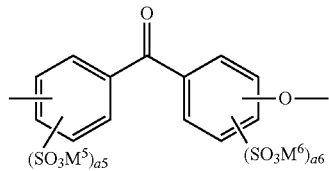
(Q3)

wherein a3 and a4 represent an integer satisfying the following equation: a3+a4=1, a5 and a6 represent an integer satisfying the following relational expression: $2 \leq a5+a6 \leq 8$, $M^3$ to $M^6$ represent a cation selected from hydrogen, a metal cation and an ammonium cation and, in the general formulas (Q1) to (Q3), a phenylene group may be substituted with an optional group excluding an ionic group, and $$0 \leq Y < Z < X < 1 \tag{S1}$$

wherein X, Y and Z represent a molar content of each structural unit based on a total molar amount of constituent units represented by the general formulas (Q1), (Q2) and (Q3), and also satisfy the following equation: X+Y+Z=1.

Fourth means is a polymer electrolyte membrane containing an ionic group-containing polymer in which an Elmendorf tearing strength as measured under an atmosphere at 23° C. and a relative humidity of 50% is 45 N/cm or more and 1,000 |N/cm|[M1].

Fifth means is a polymer electrolyte membrane containing an ionic group-containing polymer in which a tensile breaking strength as measured under an atmosphere at 25° C. and a relative humidity of 60% is 80 MPa or more and 1,000 MPa or less, and a tensile breaking elongation is 100% or more and 1,000% or less.

Furthermore, the present invention provides polymer electrolyte parts, a membrane electrode assembly or a polymer electrolyte fuel cell, each including the polymer electrolyte material or polymer electrolyte molded article.

According to the present invention, it is possible to obtain a polymer electrolyte material and a polymer electrolyte molded article, which are excellent in proton conductivity and are also excellent in fuel barrier properties, mechanical strength, physical durability, resistance to hot water, resistance to hot methanol, processability and chemical stability. A polymer electrolyte membrane using the same, and a polymer electrolyte fuel cell using the polymer electrolyte parts or membrane electrode assembly can achieve high output, high energy density and long-term durability.

BRIEF DESCRIPTION OF THE REFERENCE SYMBOLS

Figure 1:
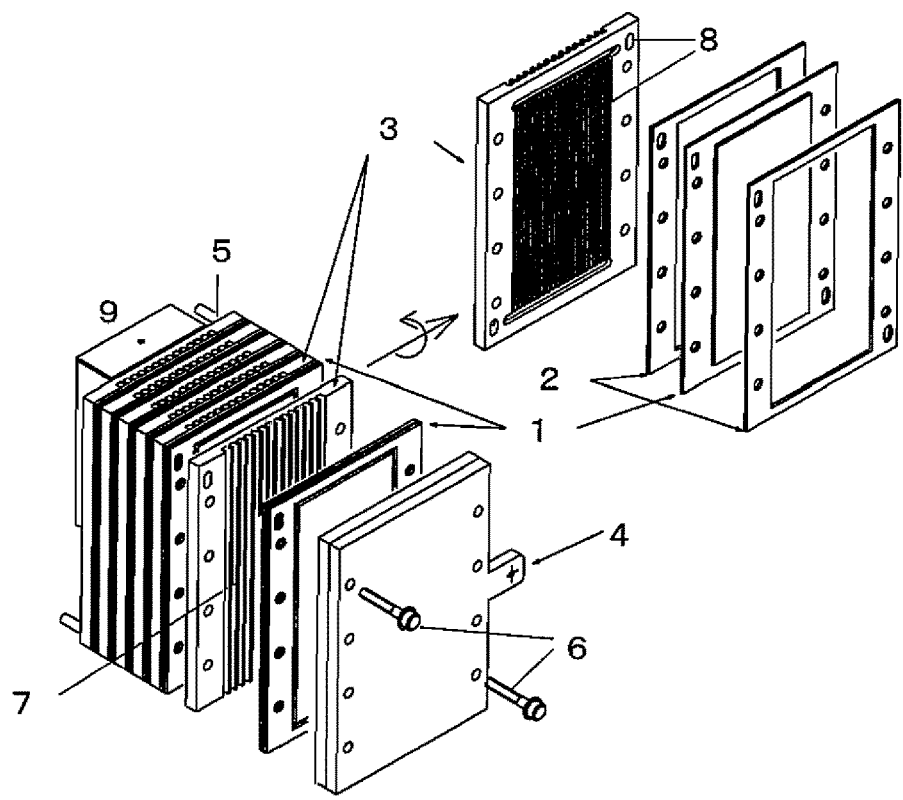
FIG. 1 is a schematic View showing an example of a stack-shaped fuel cell.

1: Membrane electrode assembly
2: Gasket
3: Bipolar separator

4: Current collecting plate
5: Fuel supply port
6: Fastening screw
7: Air flow passage
8: Fuel flow passage
9: Fuel tank

BEST MODE FOR CARRYING OUT THE INVENTION

The present inventors have intensively studied and found that properties such as high proton conductivity, fuel barrier properties, mechanical strength and physical durability of the polymer electrolyte material are largely influenced by a conformational structure of a polymer electrolyte material, namely, a crystalline state and an amorphous state of a polymer.

Namely, an aspect of the present invention is a polymer electrolyte material containing an ionic group-containing polymer in which a crystallization peak is recognized by the measurement of temperature modulation differential scanning calorimetry. In case the crystallization peak is not recognized, effects of the present invention such as mechanical strength and physical durability cannot be sufficiently obtained because of lack of crystallinity or an amount of a crystallizable amorphous moiety of a polymer.

Since the polymer electrolyte material composed of an ionic group-containing polymer such as conventional sulfonated aromatic polyether ketone or sulfonated aromatic polyethersulfone has a bulky ionic group such as sulfonic acid group, almost all of the polymer electrolyte material is composed of an amorphous polymer. The polymer electrolyte material composed of the amorphous polymer is insufficient in a cohesive force of polymer molecular chains and, therefore, the membrane thus formed is insufficient in toughness and thus sufficient mechanical strength and physical durability could not be achieved. In case of a crystalline polymer, a uniform and tough membrane could not be obtained.

The present inventors have found that proton conductivity, fuel barrier properties, resistance to hot water, resistance to hot methanol, mechanical strength, physical durability and processability can be simultaneously achieved by a polymer electrolyte material which contains a crystalline polymer and also includes a crystallizable amorphous moiety, and thus the present invention has been completed.

In the present invention, the crystalline polymer means that a polymer has a crystallizable property. Also, the amorphous polymer means a polymer which is not a crystalline polymer, in which crystallization does not substantially proceed. To the contrary, the fact that the polymer is in a crystalline state or an amorphous state, means that the polymer is in a crystalline state or an amorphous state when used regardless of the presence or absence of crystallinity of the polymer. The amorphous polymer can be only in an amorphous state. Even in case of the crystalline polymer, when crystallization does not sufficiently proceed, the polymer may be in an amorphous state. The presence or absence of crystallinity of the polymer can be evaluated by temperature modulation differential scanning calorimetry (temperature modulation DSC). Also, the crystalline state and the amorphous state can be evaluated by wide angle X-ray diffraction (XRD).

Since chemical structure and conformational structure (crystal and amorphous state) of the polymer varies as a result of crystallization, fusion and thermal decomposition of the polymer, the polymer electrolyte material of the present invention is evaluated upon first heating in temperature modulation DSC.

In case the polymer is thermally decomposed, after preliminarily confirming a thermal decomposition temperature of the polymer by thermogravimetry/differential thermal (TG-DTA), the presence or absence of a crystallization peak is confirmed during heating the temperature which is the thermal decomposition temperature or lower. In case a crystallization peak is recognized at the temperature which is the thermal decomposition temperature or higher, there is a possibility that the chemical structure of the polymer varies.

In case the polymer electrolyte material contains a crystalline polymer and also includes a crystallizable amorphous moiety, a crystallization peak is recognized in the measurement by temperature modulation differential scanning calorimetry. As used herein, the fact that a crystallization peak is recognized means that a peak of a crystallization calorie ΔH of 0.1 J/g or more is recognized. In case the crystallization peak is not recognized in temperature modulation differential scanning calorimetry of the polymer electrolyte material, the polymer electrolyte material is composed only of an amorphous polymer, or contains a crystalline polymer but does not include crystallizable amorphous moiety. In case of the polymer electrolyte material composed only of the amorphous polymer, sufficient mechanical strength, physical durability, fuel barrier properties, resistance to hot water and resistance to hot methanol cannot be obtained. When such a polymer electrolyte material is used, it is difficult to use a high concentration fuel and high energy capacity and long-term durability cannot be achieved when used for a fuel cell.

Although the polymer electrolyte material contains a crystalline polymer, when it does not contain an amorphous moiety, a tough polymer electrolyte membrane cannot be obtained because of insufficient processability. When used for a fuel cell, long-term durability cannot be achieved sometimes.

In the polymer electrolyte material of the present invention, crystallization calorie ΔH per unit weight (g) of a dried polymer as measured by temperature modulation differential scanning calorimetry (temperature modulation DSC) is preferably 2 J/g or more in view of mechanical strength, physical durability, resistance to hot methanol and fuel barrier properties. ΔH is more preferably 5 J/g or more, still more preferably 10 J/g or more, and most preferably 15 J/g or more. The upper limit of ΔH is not specifically limited, but is practically 500 J/g or less.

A crystallization peak is recognized in an irreversible process of temperature modulation DSC and is recognized within a range of a glass transition temperature or higher and a melting temperature or lower. Crystallization calorie can be calculated from the area of the crystallization peak. In case of a polymer electrolyte material having a sulfonic acid group, the crystallization temperature is close to a thermal decomposition temperature or a melting temperature and the high temperature of the crystallization peak may be influenced by decomposition or fusion. Therefore, in the present invention, the value, which is obtained by doubling calorie from the low temperature to a peak top, is defined as crystallization calorie.

Also, crystallinity of the polymer electrolyte material of the present invention, which is measured by wide angle X-ray diffraction, is preferably less than 0.5%. When the crystallinity is 0.5% or more, a uniform and tough electrolyte membrane may not be obtained because of insufficient processability, or the resulting electrolyte membrane is insufficient in long-term durability because of insufficient toughness, and therefore it is not preferred.

The measurement of temperature modulation DSC and wide angle X-ray diffraction of the polymer electrolyte material was described in detail in examples described hereinafter.

Another aspect of the present invention is a method for producing a polymer electrolyte molded article made of a polymer electrolyte material comprising the crystalline polymer described above and a crystallizable amorphous moiety.

The present invention is characterized in that a polymer electrolyte precursor having a protective group and an ionic group is formed and then at least a portion of protective groups contained in the resulting molded article is deprotected to obtain a polymer electrolyte molded article.

The polymer electrolyte molded article in the present invention can take various forms such as membrane (including film and film-shaped article), plate, fiber, hollow yarn, particle, mass, foam and the like according to the purposes. Herein, the membrane includes a membrane formed by coating and also can be applied to a binder of a catalyst layer.

The present invention is particularly preferred when the polymer electrolyte molded article is in the form of a membrane. The present invention will now be described in case of a membrane.

The crystalline polymer used in the present invention has a strong intermolecular cohesive force and therefore has a property of being insoluble in a common solvent. In the present invention, crystallinity of a crystalline polymer is lowered by introducing a protective group into a polymer, thereby imparting solubility, thus making it possible to use the resulting product for formation of a membrane. The polymer having a protective group introduced therein is referred to as a polymer electrolyte precursor hereinafter. After forming the polymer electrolyte precursor into a membrane, at least a portion of protective groups is deprotected to obtain a polymer electrolyte membrane. The deprotection enables the crystalline polymer to exhibit intrinsic properties with respect to packing of molecular chains, intermolecular cohesive force and crystallinity of the polymer. Consequently, it became possible to form a membrane of a polymer electrolyte material made of a crystalline polymer which could have not been used.

The use of this technology makes it possible to obtain a polymer electrolyte membrane, which contains a moiety in which a crystalline polymer is in a crystallizable amorphous state, by forming a membrane in a state of a polymer electrolyte precursor having low crystallinity, followed by deprotection.

Thus, the present inventors have succeeded in obtaining a polymer electrolyte membrane having remarkably improved resistances to solvents such as resistance to hot water and resistance to hot methanol; mechanical properties such as tensile strength, tear strength and resistance to fatigue; and fuel barrier properties to methanol and hydrogen.

The protective group used in the present invention includes, for example, protective groups used commonly in organic synthesis. The protective group is a substituent which is temporarily introduced on the assumption that it is removed in the following stage, and is capable of protecting a functional group having high reactivity, and deprotecting the functional group thereby returning to an original functional group. Namely, the protective group is paired with a functional group to be protected. The reaction for introducing a protective group is referred to as a protection reaction, while the reaction for removing a protective group is referred to as a deprotection reaction.

Such a protection reaction is described in detail, for example, in Theodora W. Greene, "Protective Groups in Organic Synthesis", U.S.A., John Wiley & Sons, Inc, 1981, and the protection reaction can be preferably used. The protective group can be appropriately selected taking account of reactivity and yield of the protection reaction and deprotection reaction, stability of protective group-containing state, and production cost. The stage, at which the protective group is introduced in the polymerization reaction, may be a monomer stage, an oligomer stage or a polymer stage, and can be appropriately selected.

Specific examples of the method for protection reaction include a method for protection/deprotection of a ketone moiety with ketal or hetero atom analogs of ketal, such as thioketal and this method is described in Chapter 4 of aforementioned "Protective Groups in Organic Synthesis". Examples thereof further include a method for protection/deprotection between sulfonic acid and a soluble ester derivative, and a protection method of introducing a t-butyl group into an aromatic ring and a deprotection method through de-t-butylation with an acid.

In the present invention, in order to lower crystallinity by improving solubility of the polymer in a solvent, it is preferred to use, as the protective group, an aliphatic group having large steric hindrance, particularly an aliphatic group containing a cyclic moiety.

The position of the functional group, at which the protective group is introduced, is preferably a main chain of the polymer. Even if the protective group is introduced in the side chain of the polymer, sufficient effect of lowering crystallinity cannot be obtained sometimes. As used herein, the functional group, which is present in the main chain of the polymer, is defined as a functional group in which a polymer chain is cleaved when the functional group is eliminated. The functional group includes, for example, a ketone group of an aromatic polyether ketone.

The polymer used in the polymer electrolyte material of the present invention is preferably a hydrocarbon-based polymer having an aromatic ring in a main chain, which has an ionic group, in view of mechanical strength, physical durability and chemical stability. Particularly, a polymer having sufficient mechanical strength and physical durability suited for use as an engineering plastic is preferable. The aromatic ring may include, in addition to the hydrocarbon-based aromatic ring, a hetero ring. Also, an aliphatic unit may partially constitute the polymer, along with the aromatic ring unit. The aromatic unit may have optional substituents, for example, a hydrocarbon-based group such as alkyl group, a halogen group, a nitro group, a cyano group, an amino group, a halogenated alkyl group, a carboxyl group, a phosphonic acid group, and a hydroxyl group.

Specific examples of the polymer having an aromatic ring in a main chain include polymers such as polysulfone, polyethersulfone, polyphenylene oxide, polyarylene ether-based polymer, polyphenylene sulfide, polyphenylene sulfide sulfone, polyparaphenylene, polyarylene-based polymer, polyaryleneketone, polyether ketone, polyarylene phosphinoxide, polyether phosphinoxide, polybenzoxazole, polybenzthiazole, polybenzimidazole, aromatic polyamide, polyimide, polyetherimide, and polyimidesulfone. As used herein, polysulfone, polyethersulfone and polyether ketone are generic names of polymers having a sulfone bond, an ether bond and a ketone bond in the molecular chain and include, for example, polyether ketoneketone, polyetherether ketone, polyetherether ketoneketone, polyether ketone ether ketoneketone, and polyether ketone sulfone, but it is not intended to limit a specific polymer structure.

Among these polymers, polymers such as polysulfone, polyethersulfone, polyphenylene oxide, polyarylene ether-based polymer, polyphenylene sulfide, polyphenylene sulfide sulfone, polyarylene ketone, polyether ketone, polyarylene phosphinoxide, and polyether phosphinoxide are preferable in view of mechanical strength, physical durability, processability and resistance to hydrolysis.

Specific examples thereof include polymers comprising a repeating unit represented by the following general formula (T1):

[Chemical Formula 2]

(T1)

Wherein $Z^1$ and $Z^2$ represent an organic group containing an aromatic ring and two or more kinds of groups may be used as each group, and at least a portion of $Z^1$ and $Z^2$ has an ionic group; $Y^1$ represents an electron-withdrawing group; $Y^2$ represents oxygen or sulfur; and a and b each independently represents 0 or a positive integer, provided that a and b does not simultaneously represent 0.

An organic group as $Z^1$ and $Z^2$ is preferably a phenylene group, a naphthylene group, or a biphenylene group. These groups may be substituted. In view of solubility and availability of materials, $Z^1$ and $Z^2$ are simultaneously phenylene groups, more preferably. Most preferably, $Z^1$ and $Z^2$ are simultaneously p-phenylene groups.

An organic group as $Y^1$ is preferably a sulfonyl group, a carbonyl group, or a phosphoryl group. Among these groups, a carbonyl group is preferable.

Among the polymer comprising a repeating unit represented by the general formula (T1), which has an aromatic ring in a main chain, a polymer comprising repeating units represented by the general formulas (T1-1) to (T1-6) is more preferable in view of resistance to hydrolysis, mechanical strength, physical durability and production cost:

[Chemical Formula 3]

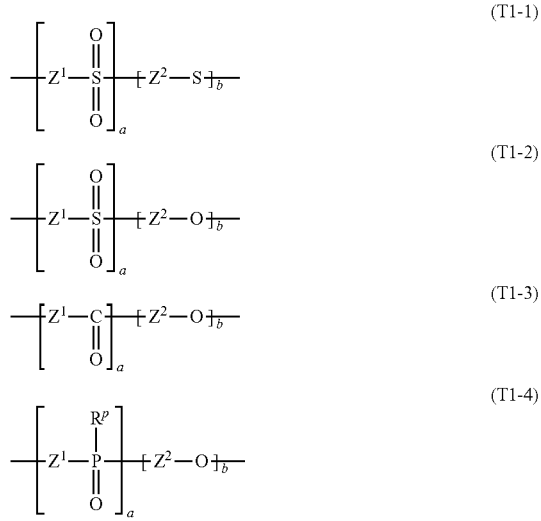

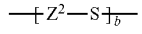 (T1-5)

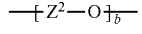 (T1-6)

Wherein $Z^1$, $Z^2$, a and b are as defined above. Preferable examples of the organic group represented by $R^P$ are a methyl group, an ethyl group, a propyl group, an isopropyl group, a cyclopentyl group, a cyclohexyl group, a norbornyl group, a vinyl group, an allyl group, a benzyl group, a phenyl group, a naphthyl group, and a phenylphenyl group. In view of industrial availability, $R^P$ is most preferably a phenyl group.

In view of mechanical strength, physical durability and production cost, an aromatic polyether-based polymer in which $Y^2$ is oxygen is more preferable. An aromatic polyether ketone (PEK)-based polymer, namely, a polymer comprising a repeating unit represented by the above general formula (T1-3) is particularly preferable because it exhibits crystallinity because of good packing of a main chain skeleton structure and very strong intermolecular cohesive force, and also has a property of being insoluble in a common solvent and is excellent in tensile strength, tear strength and resistance to fatigue. As used herein, the aromatic polyether ketone-based polymer is a generic name of a polymer having at least an ether bond and a ketone bond in the molecular chain and includes polyether ketone, polyether ketoneketone, polyetherether ketone, polyetherether ketoneketone, polyether ketone ether ketoneketone, polyether ketone sulfone, polyether ketone phosphine oxide, and polyether ketone nitrile.

Preferable specific examples of the structural unit included in the polymer electrolyte material include dihydric phenol residues represented by the following general formulas (X-1) to (X-28):

[Chemical Formula 4]

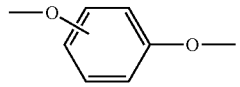 (X-1)

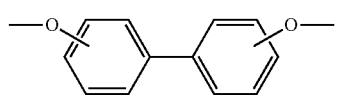 (X-2)

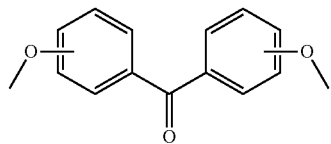 (X-3)

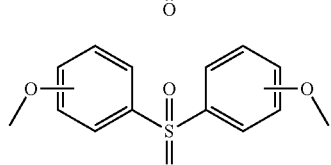 (X-4)

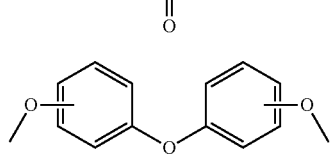 (X-5)

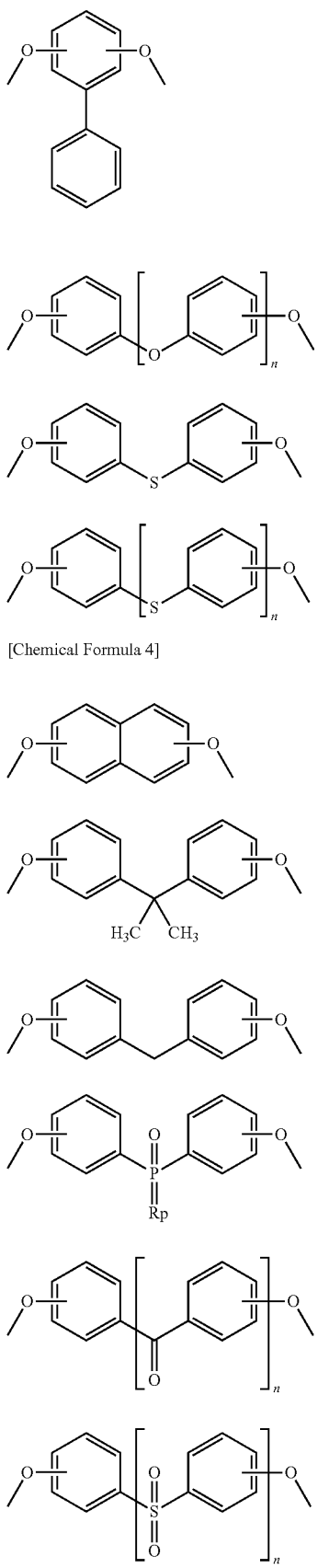
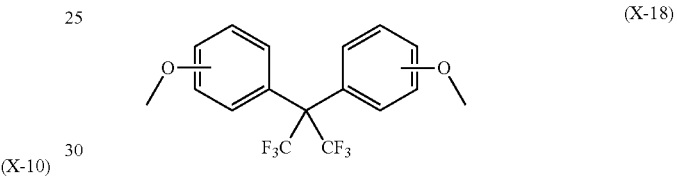
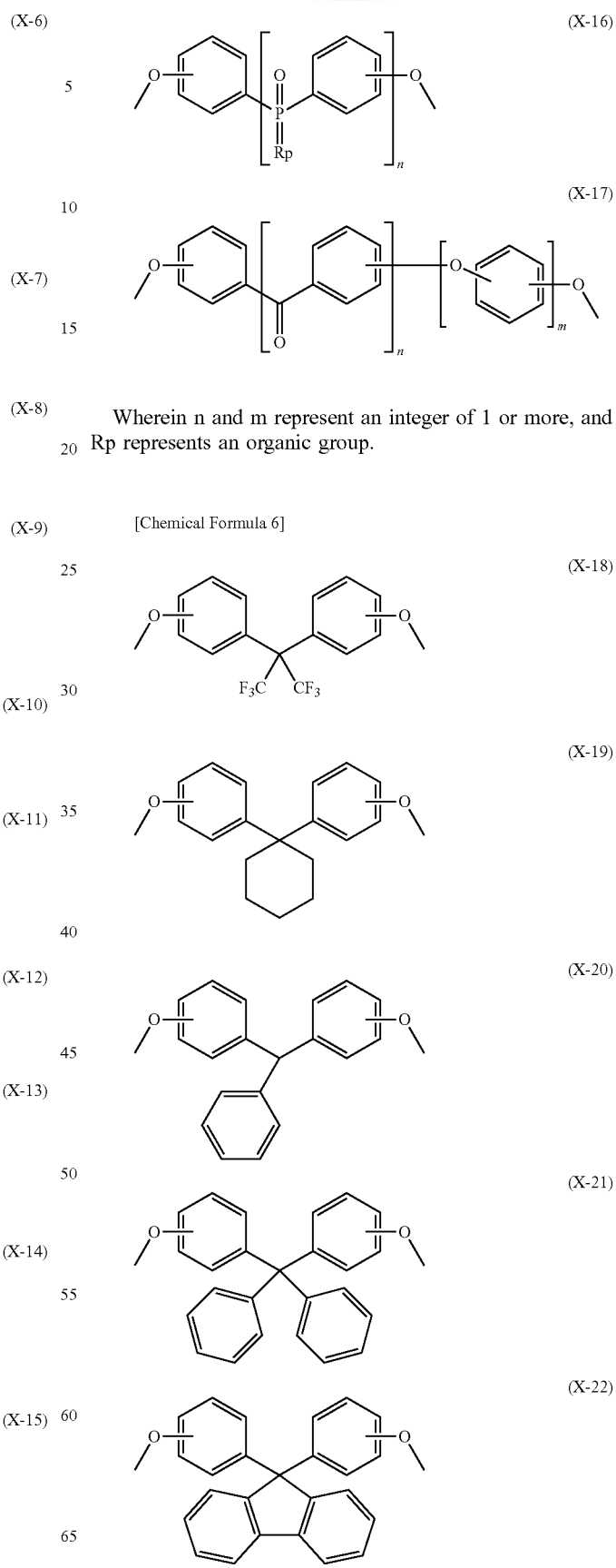
Wherein n and m represent an integer of 1 or more, and Rp represents an organic group.
[Chemical Formula 6]

(X-23)
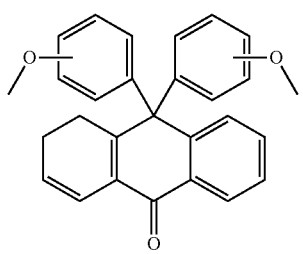

[Chemical Formula 7]

(X-24)
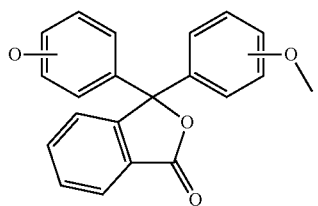

(X-25)
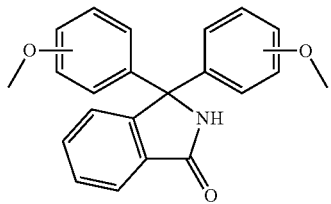

(X-26)
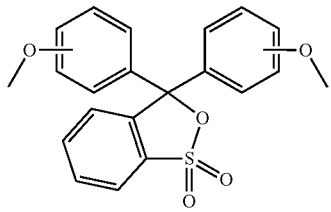

(X-27)
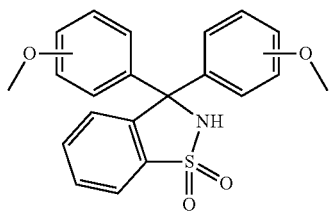

(X-28)
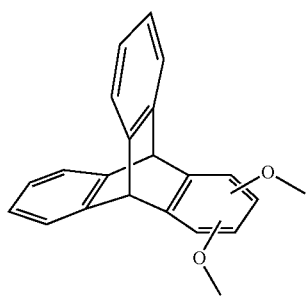

These residues may have a substituent and an ionic group, and can be used in combination, if necessary.

Particularly, a polymer electrolyte material containing dihydric phenol residues represented by the general formulas (X-1) to (X-17) are preferably used because excellent performances such as mechanical properties, resistance to solvents, fuel barrier properties and long-term durability can be exhibited. Dihydric phenol residues represented by the general formulas (X-1) to (X-5), (X-7), (X-14) and (X-17) are more preferable and dihydric phenol residues represented by the general formulas (X-1) to (X-5) are most preferably.

Also, dihydric phenol residues represented by the general formulas (X-18) to (X-28) can be preferably used because they have the effect of enhancing hydrophobicity or rigidity and therefore have a large fuel crossover inhibitory effect is exerted and is effective to improve dimensional stability in a fuel. Among these, dihydric phenol residues represented by the general formulas (X-21) and (X-22) are preferable and a dihydric phenol residue represented by the general formula (X-21) is particularly preferable.

The ionic group used in the present invention is not specifically limited as long as it is an atomic group having negative charge, and those having proton exchange capability are preferable. As the functional group, a sulfonic acid group, a sulfoneimide group, a sulfuric acid group, a phosphonic acid group, a phosphoric acid group, and a carboxylic acid group are preferably used. As used herein, the sulfonic acid group means a group represented by the following general formula (f1), the sulfoneimide group means a group represented by the following general formula (f2) [in the general formula, R means an atomic group], the sulfuric acid group represents a group represented by the following general formula (f3), the phosphonic acid group means a group represented by the following general formula (f4), the phosphoric acid group means a group represented by the following general formula (f5) or (f6), and the carboxylic acid group means a group represented by the following general formula (f7).

[Chemical Formula 8]

(f1)
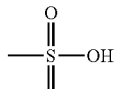

(f2)
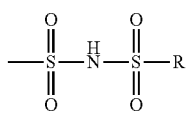

(f3)
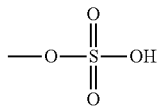

(f4)
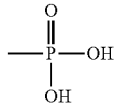

(f5)
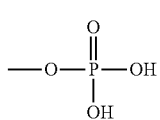

(f6)
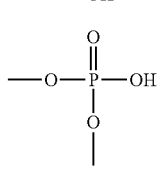

-continued

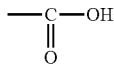
(f7)

Such an ionic group includes the case where the functional groups (f1) to (f7) are in the form of a salt. Examples of the cation, which forms the salt, include metal cation, and $NR_4^+$ (R is an organic group) In case of a metal cation, its valence is not specifically limited and any metal cation can be used. Preferable specific examples of the metal ion include ions of Li, Na, K, Rh, Mg, Ca, Sr, Ti, Al, Fe, Pt, Rh, Ru, Ir, and Pd. Among these metal ions, Na or K ion is preferably used in the polymer electrolyte membrane because it is cheap and does not exert an adverse influence on solubility, and also can be easily protonated. The polymer electrolyte can have two or more kinds of ionic groups. The ionic group is preferably a group selected from among a sulfonic acid group, a sulfoneimide group and a sulfuric acid group in view of high proton conductivity. In view of resistance to hydrolysis, a sulfonic acid group is most preferable.

In the method for producing a polymer electrolyte molded article of the present invention, first, a polymer electrolyte precursor having a protective group is synthesized. A constituent unit having a protective group, which constitutes the polymer electrolyte precursor, is preferably obtained by protecting ketone moieties represented by the following general formulas (P1) and (P2) with ketal or thioketal.

[Chemical Formula 9]

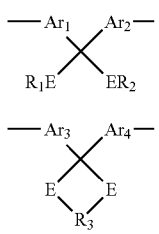

(P1)

(P2)

In the general formulas (P1) and (P2), $Ar_1$ to $Ar_4$ represents an divalent arylene group, $R_1$ and $R_2$ represent at least one kind of a group selected from among H and an alkyl group, $R_3$ represents an alkylene group, and E represents oxygen or sulfur. Two or more kinds of groups may be used as each group. Groups represented by the general formulas (P1) and (P2) may be optionally substituted.

In view of reactivity and stability of the protective group, it is most preferred that E is oxygen, namely, the ketone moiety is protected with ketal.

In view of stability of the protective group, $R_1$ and $R_2$ represent more preferably an alkyl groups, still more preferably an alkyl group having 1 to 6 carbon atoms, and most preferably an alkyl group having 1 to 3 carbon atoms. In view of stability of the protective group as $R_3$, an alkylene group having 1 to 7 carbon atoms is more preferable and an alkylene group having 1 to 4 carbon atoms is most preferable. Specific examples of $R_3$ include, but are not limited to, —$CH_2CH_2$—, —$CH(CH_3)CH_2$—, —$CH(CH_3)CH(CH_3)$—, —$C(CH_3)_2CH_2$—, —$C(CH_3)_2CH(CH_3)$—, —$C(CH_3)O(CH_3)_2$—, —$CH_2CH_2CH_2$—, and —$CH_2C(CH_3)_2CH_2$—.

In view of stability such as resistance to hydrolysis, the polymer electrolyte precursor to be used is preferably a polymer electrolyte precursor comprising a cyclic ketal unit represented by the general formula (P2) among those comprising constituent unit represented by the general formula (P1) or (P2).

An organic group as $Ar_1$ to $Ar_4$ in the general formulas (P1) and (P2) is preferably a phenylene group, a naphthylene group, or a biphenylene group. These organic groups may be optionally substituted. In view of solubility and availability of materials, the polymer electrolyte precursor more preferably comprises a constituent unit represented by the following general formula (P2) in which $Ar_3$ and $Ar_4$ simultaneously represent a phenylene group, namely, a constituent unit represented by the following general formula (P3). Most preferably, $Ar_3$ and $Ar_4$ simultaneously represent a p-phenylene group. As described above, a phenylene group may be substituted.

[Chemical Formula 10]

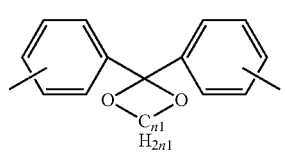

(P3)

wherein n1 represents an integer of 1 to 7

The method of protecting a ketone moiety with ketal includes a method of reacting a compound having a ketone group with a monofunctional and/or difunctional alcohol in the presence of an acid catalyst. The alcohol is preferably an aliphatic monofunctional alcohol having 1 to 6 carbon atoms, or an aliphatic difunctional alcohol having 1 to 7 carbon atoms. In view of stability of the protective group, a difunctional alcohol is more preferable.

Specific examples of the difunctional alcohol include, but are not limited to, ethylene glycol, propylene glycol, 2,3-butanediol, 2-methyl-1,2-propanediol, 2-methyl-2,3-butanediol, 2,3-dimethyl-2,3-butanediol, 1,3-propanediol, and 2,2-dimethyl-1,3-propanediol. Among these alcohols, ethylene glycol, propylene glycol, or 2-methyl-1,2-propanediol is preferable in view of stability of the protective group.

It is preferred that the reaction is carried out in the presence of an alkyl orthoester using a solid catalyst as the catalyst.

Examples of the alkyl orthoester include trimethyl orthoformate, triethyl orthoformate, trimethyl orthoacetate, triethyl orthoacetate, tetramethyl orthosilicate, and tetraethyl orthosilicate. Also, it is possible to use a compound, which is easily hydrolyzed to form a volatile product, such as 2,2-dimethoxypropane or 2,2-dimethyl-1,3-dioxolane in place of the orthoester.

The solid catalyst is preferably a fine granular acidic alumina-silica compound, and most preferably montmorillonite clay such as montmorillonite referred to as K-10 (for example, a reagent manufactured by Aldrich Co.). Other solid acidic catalyst having a large surface area can also be effectively used. These catalysts include acidic alumina and sulfonated polymer resin.

In case the ketalation reaction is carried out, an alcohol is added in an amount of about 1 equivalent or more, and preferably an excess amount, based on the ketone group. The orthoester is also added in an amount of about 1 equivalent or more, and preferably an excess amount, based on the ketone group. The solid catalyst is used in an amount of at least 1 g, and preferably 10 g or more, based on 1 equivalent of the ketone group. The solid catalyst can be reused because it can be easily removed even when used in an excess amount.

The reaction is carried out in the presence of an inert solvent, if necessary. The reaction is carried out at a temperature within a range from about 25° C. to about boiling point of the orthoester used. The reaction is preferably carried out at a temperature which is lower than the boiling point of the orthoester and is higher than the boiling point of the orthoester reaction product. For example, when using trimethyl orthoformate (boiling point: 102° C.) from which methanol (boiling point: 65° C.) and methyl formate (boiling point: 34° C.) are obtained as reaction products, the reaction temperature is preferably from about 65 to 102° C. As a matter of course, the reaction temperature can be appropriately adjusted when the reaction is carried out under reduced or increased pressure.

For example, when a mixture of 4,4'-dihydroxybenzophenone, excess glycol, excess trialkyl orthoformate and clay in an amount of about 0.5 to 2.5 g per 1 g of ketone is reacted and heated while distilling off an alcohol obtained from the orthoformate ester, a ketalated product, namely, 2,2-bis(4-hydroxyphenyl)-1,3-dioxolane can be obtained in excellent yield (60% to almost quantitative) within 48 hours as the reaction time.

Using the resulting ketalated monomer, the polymerization reaction is carried out to obtain a polymer protected with ketal.

The ketalated monomer and the unreacted ketone can be recovered by a standard isolation method if an attention is appropriately paid so as not to acidify the interior of the system. Before the ketalated monomer is used in the production of the polymer, recrystallization and large-scaled purification of the isolation reaction product are not required. For example, the reaction mixture is diluted with an ethyl acetate solvent and the solid catalyst is removed by filtration, and then the solution is extracted with water to remove the excess alcohol. After moisture is removed by a conventional desiccating agent such as anhydrous sodium sulfate, and then the solvent and the volatile matter are removed under vacuum. The resulting solid is washed with a solvent such as methylene chloride to remove a trace amount of contaminants, and thus a reaction product capable of containing a slight amount of the unreacted ketone is obtained. This reaction product can be used in the production of the polymer without being purified. Also, the unreacted ketone can be removed by recrystallization using a common solvent such as toluene.

The method of obtaining a polymer protected with ketal will be described using an aromatic polyether-based polymer as an example. The method for synthesizing an aromatic polyether-based polymer is not specifically limited as long as it is a method capable of substantially increasing a molecular weight. For example, the polymer can be synthesized by the aromatic nucleophilic substitution reaction of an aromatic active dihalide compound and a dihydric phenol compound, or the aromatic nucleophilic substitution reaction of a halogenated aromatic phenol compound.

Specifically, the aromatic polyether-based polymer comprising constituent unit represented by the general formula (P1) or (P2) can be synthesized by using, as a dihydric phenol compound, a compound represented by the following general formula (P1-1) or (P2-1), followed by the aromatic nucleophilic substitution reaction the compound with an aromatic active dihalide compound. The constituent units represented by the general formulas (P1) and (P2) may be derived from either the dihydric phenol compound or the aromatic active dihalide compound, but are more preferably derived from the dihydric phenol compound taking account of reactivity of the monomer.

[Chemical Formula 11]

In the formula, $Ar_1$ to $Ar_4$ represent an divalent arylene group, $R_1$ and $R_2$ represent at least one kind of a group selected from H and an alkyl group, $R_3$ represents an alkylene group, and E represents oxygen or sulfur. The compounds represented by the general formulas (P1-1) and (P2-1) may be optionally substituted.

Specific examples of particularly preferable dihydric phenol compound include compounds represented by the following general formulas (r1) to (r10), and derivatives thereof.

[Chemical Formula 12]

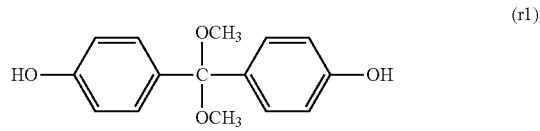

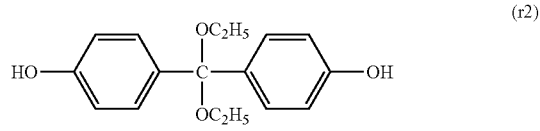

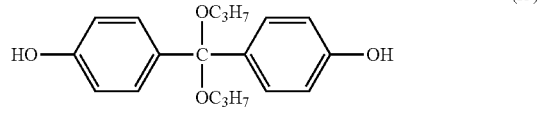

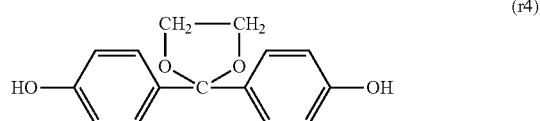

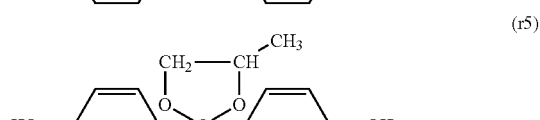

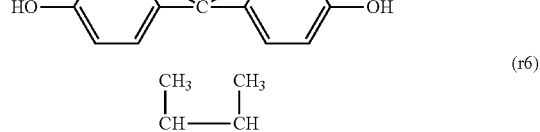

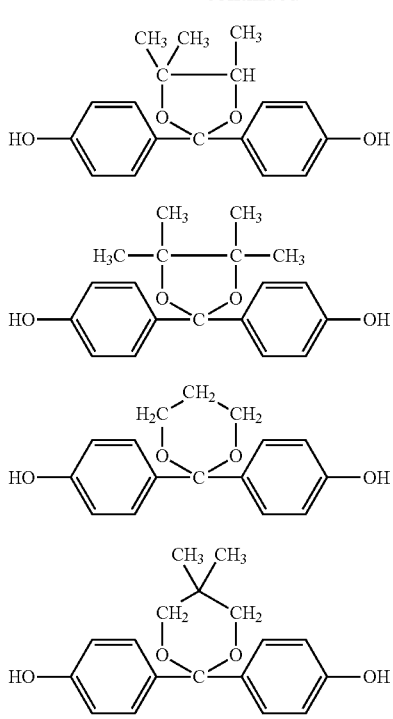

(r7)

(r8)

(r9)

(r10)

Among these dihydric phenol compounds, compounds represented by the general formulas (r4) to (r10) are more preferable in view of stability, more preferably compounds represented by the general formulas (r4), (r5) and (r9), and most preferably a compound represented by the general formula (r4).

The aromatic active dihalide compound is not specifically limited as long as the molecular weight can be increased by the aromatic nucleophilic substitution reaction with the dihydric phenol compound. Preferable specific examples of the aromatic active dihalide compound include 4,4'-dichlorodiphenylsulfone, 4,4'-difluorodiphenylsulfone, 4,4'-dichlorodiphenylketone, 4,4'-difluorodiphenylketone, 4,4'-dichlorodiphenylphenylphosphine oxide, 4,4'-difluorodiphenylphenylphosphine oxide, 2,6-dichlorobenzonitrile, and 2,6-difluorobenzonitrile. Among these compounds, 4,4'-dichlorodiphenylketone or 4,4'-difluorodiphenylketone are more preferable in view of crystallization, mechanical strength, physical durability, resistance to hot methanol and fuel barrier properties, and 4,4'-difluorodiphenylketone is most preferable in view of polymerization activity. These aromatic active dihalide compounds can be used alone or in combination.

Examples of the halogenated aromatic phenol compound include 4-hydroxy-4'-chlorobenzophenone, 4-hydroxy-4'-fluorobenzophenone, 4-hydroxy-4'-chlorodiphenylsulfone, 4-hydroxy-4'-fluorodiphenylsulfone, 4-(4'-hydroxybiphenyl)(4-chlorophenyl)sulfone, 4-(4'-hydroxybiphenyl)(4-fluorophenyl)sulfone, 4-(4'-hydroxybiphenyl)(4-chlorophenyl)ketone, and 4-(4'-hydroxybiphenyl)(4-fluorophenyl)ketone. These halogenated aromatic phenol compounds can be used alone or in combination. In the reaction of an activated dihalogenated aromatic compound and an aromatic dihydroxy compound, an aromatic polyether-based compound may be synthesized by reacting together with a halogenated aromatic phenol compound.

Also, a halogenated aromatic hydroxy compound having a protective group is preferable. Specific examples thereof include those represented by the following general formulas (h1) to (h7):

[Chemical Formula 13]

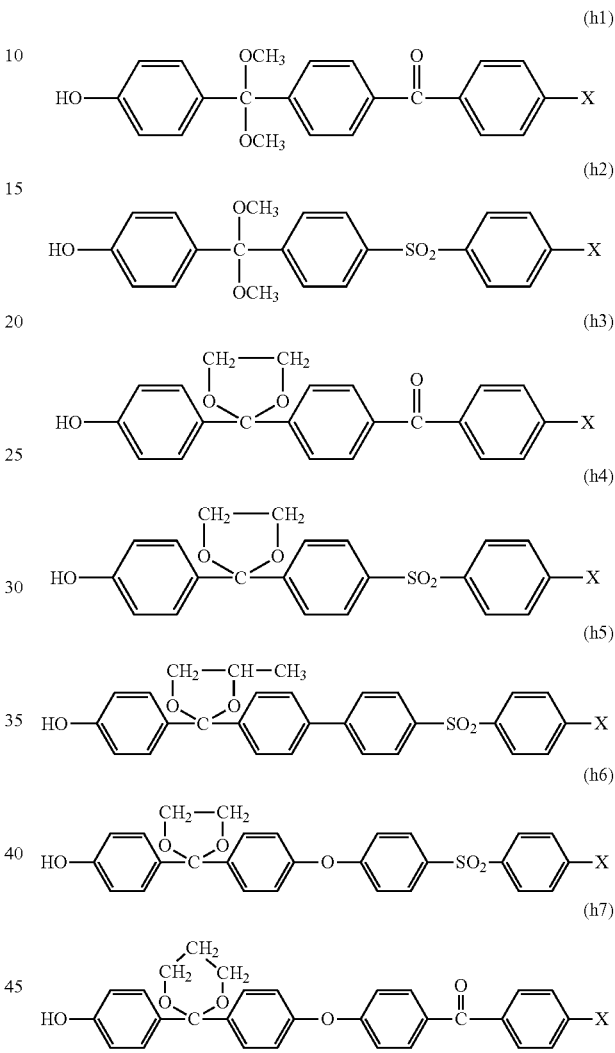

Wherein X represents F or Cl.

In the synthesis of the aromatic polyether-based polymer, a monomer having an ionic group is also preferably used in combination. It is preferred to use, as the monomer, a compound obtained by introducing an ionic group into an aromatic active dihalide compound because the amount of the ionic group included in the resulting polymer can be accurately controlled. In view of proton conductivity and resistance to hydrolysis, the ionic group included in the monomer is most preferably a sulfonic acid group, but the polymer may have the other ionic group. Examples of the monomer having a sulfonic acid group as the ionic group include 3,3'-disulfonate-4,4'-dichlorodiphenylsulfone, 3,3'-disulfonate-4,4'-difluorodiphenylsulfone, 3,3'-disulfonate-4,4'-dichlorodiphenylketone, 3,3'-disulfonate-4,4'-difluorodiphenylketone, 3,3'-disulfonate-4,4'-dichlorodiphenylphenylphosphine oxide, and 3,3',-disulfonate-4,4'-difluorodiphenylphenylphosphine oxide.

Among these monomers, 3,3'-disulfonate-4,4' dichlorodiphenylketone and 3,3'-disulfonate-4,4' difluorodiphenylketone are more preferable in view of resistance to hot methanol and fuel barrier properties, and 3,3',-disulfonate-4,4'-difluorodiphenylketone is most preferably in view of polymerization activity.

In case of the polymerization, a sulfonic acid group is preferably combined with a monovalent cation species to form a salt. Examples of the monovalent cation species include sodium, potassium or other metal species, and various ammonium cation species.

The sulfonic acid group in the polymer used as a polymer electrolyte material may be introduced by block copolymerization or random copolymerization. It can be appropriately selected according to the chemical structure or crystallinity of the polymer to be used. In case fuel barrier properties and low moisture content are required, random copolymerization is more preferable. In case proton conductivity and high moisture content are required, block copolymerization is more preferably used.

The polymerization through the aromatic nucleophilic substitution reaction, which is carried out so as to obtain an aromatic polyether-based polymer, can be carried out by reacting a mixture of the above monomers in the presence of a basic compound. The polymerization is preferably carried out at a temperature within a range from 0 to 350° C., and more preferably from 50 to 250° C. When the reaction temperature is lower than 0° C., the reaction may not proceed sufficiently. On the other hand, when the reaction temperature is higher than 350° C., decomposition of the polymer may be initiated. The reaction can be carried out in the absence of a solvent, but is preferably carried out in a solvent. Examples of preferable solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphonetriamide. The solvent may be any solvent which can be used as a stable solvent in the aromatic nucleophilic substitution reaction. These organic solvents can be used alone or in combination.

Examples of preferable basic compound include sodium hydroxide, potassium hydroxide, sodium carbonate, potassium carbonate, sodium hydrogen carbonate, and potassium hydrogen carbonate. The basic compound can be used without any limitation as long as it can convert aromatic diols into an active phenoxide structure.

In the aromatic nucleophilic substitution reaction, water is sometimes produced as by-product. In this case, water can also be discharged out of the system in the form of an azeotrope in the copresence of an azeotropic agent such as toluene in the reaction system. As the method of discharging water out of the system, an absorbent such as molecular sieve can be used.

The reaction is preferably carried out under an inherent atmosphere.

When the aromatic nucleophilic substitution reaction is carried out in a solvent, the monomer is preferably charged so as to adjust the concentration of the resulting polymer within a range from 5 to 50% by weight. When the concentration is less than 5% by weight, the polymerization degree may hardly increase. On the other hand, when the concentration is more than 50% by weight, viscosity of the reaction system increases and it may become difficult to subject the reaction product to a post-treatment.

After the completion of the polymerization reaction, the reaction solution is vaporized to remove the solvent and the residual substance is optionally washed to obtain a desired polymer. Also, the reaction solution is added in a solvent having low solubility with a polymer and high solubility with an inorganic salt produced as by-product, thereby to remove the inorganic salt and to precipitate a polymer as a solid, and the precipitate is collected by filtration to obtain a polymer. The recovered polymer is optionally washed with water, an alcohol or other solvents, and then dried. A halide or phenoxide end group can be optionally reacted with a phenoxide or halide end blocking agent which forms a stable end group.

In order to introduce the protective group without being deprotected up to a forming stage, polymerization and purification are carried out taking account of conditions which enable the protective group to stably exist. In case of using ketal as the protective group, the deprotection reaction proceeds under an acidic condition, and therefore the system is maintained in a neutral or alkali state.

Then, at least a portion of protective groups of the polymer electrolyte precursor thus obtained is deprotected to obtain a polymer electrolyte material. The method of obtaining a polymer electrolyte molded article includes a method of forming a polymer electrolyte precursor and deprotecting the polymer electrolyte precursor to obtain a polymer electrolyte molded article, and a method of deprotecting a polymer electrolyte precursor to obtain a polymer electrolyte material and forming the polymer electrolyte material. In the present invention, in view of mechanical strength, physical durability and resistance to solvents, a method of forming a polymer electrolyte precursor into a membrane and treating the membrane with an acid is preferably used. The case where a molded article is a membrane and a protective group is a ketal group will now be described in detail.

The method of forming a polymer electrolyte precursor into a membrane is not specifically limited, and a method of forming a membrane from a solution state or a method of forming a membrane from a molten state can be used. In the former, for example, the polymer electrolyte precursor is dissolved in a solvent such as N-methyl-2-pyrrolidone and the solution is applied and spread over a glass plate, and then the solvent is removed to form a membrane.

The solvent used to form a membrane is not specifically limited as long as it can dissolve an aromatic polyether-based polymer and can be removed, and it is possible to preferably use an aprotic polar solvent such as N,N-dimethylacetamide, N,N-dimethylformamide, N-methyl-2-pyrrolidone, dimethyl sulfoxide, sulfolane, 1,3-dimethyl-2-imidazolidinone, or hexamethylphosphonetriamide; an ester-based solvent such as γ-butyrolactone and butyl acetate; carbonate-based solvents such as ethylene carbonate or propylene carbonate; an alkylene glycol monoalkyl ether such as ethylene glycol monomethyl ether, ethylene glycol monoethyl ether, propylene glycol monomethyl ether, or propylene glycol monoethyl ether; an alcohol-based solvent such as isopropanol; water and a mixture thereof. An aprotic polar solvent is preferable because of its highest solubility.

It is preferred to subject a polymer solution prepared so as to have a required solid content to filtration under normal pressure or pressure filtration to remove foreign matters contained in the polymer electrolyte solution, in order to obtain a tough membrane. A filter medium used herein is not specifically limited and is preferably a glass filter or a metal filter. A minimum pore size of the filter, through which the polymer solution passes in the filtration, is preferably 1 μm or less.

The deprotection reaction of a ketone moiety protected with ketal can be carried out under non-uniform or uniform conditions in the presence of water and an acid. Specifically, deprotection can be carried out by dipping the formed membrane in an aqueous solution of an acid catalyst.

Examples of preferable acid catalyst include a strong mineral acid such as hydrochloric acid, nitric acid, fluorosulfonic acid, or sulfuric acid; and a strong organic acid such as p-toluenesulfonic acid or trifluoromethanesulfonic acid. According to the thickness of a polymer electrolyte material, the acid catalyst, amount of excess water and reaction pressure can be appropriately selected. The acid catalyst is preferably used in the concentration of 0.1 to 50% by weight based on existing water. The amount of the aqueous acidic solution is preferably from 1 to 100 times more than that of the polymer electrolyte material, in terms of a weight ratio, but a large excess amount of the aqueous acidic solution may be used.

In case of a membrane having a thickness of 50 µm, it is possible to deprotect almost all of protective groups by dipping the membrane in an aqueous 6N hydrochloric acid solution and heating at 95° C. for 1 to 48 hours. It is also possible to deprotect almost all of protective groups by dipping the membrane in an aqueous 1N hydrochloric acid solution at 25° C. for 24 hours. The conditions of deprotection are not limited to these conditions and it is possible to deprotect with an acidic gas or an organic acid, or a heat treatment.

The content of the residual constituent unit selected from the general formula (P1) or (P2) in the polymer electrolyte material obtained by deprotection is preferably 50 mol % or less based on the total molar amount of the dihydric phenol residue in view of crystallinity, mechanical properties, resistance to hot methanol and fuel barrier properties. In view of mechanical properties, fuel barrier properties and dimensional stability, the content is preferably 20 mol % or less, more preferably 5 mol % or less, and most preferably detection limit or less.

In case the resulting polymer electrolyte material is used for forming, the total molar amount of the constituent units of the general formulas (P1-1) and (P2-1) is preferably 5 mol % or more based on the total molar amount of the entire dihydric phenol compound so as to impart solubility. When the total molar amount of the constituent units of the general formulas (P1-1) and (P2-1) is less than 5 mol %, membrane forming properties may become insufficient because of poor solubility. The total molar amount of the constituent units of the general formulas (P1-1) and (P2-1) is more preferably 30 mol % or more, and still more preferably 45 mol %, in view of the effect of improving solubility. A polymer electrolyte material comprising a large amount of constituent units represented by the general formulas (P1) and/or (P2) is excellent in solubility and processability and therefore it can be particularly preferably used as the soluble polymer electrolyte material for forming a very tough polymer electrolyte membrane.

The content of the constituent unit selected from the general formulas (P1) or (P2) is preferably determined by dissolving in a solvent and measuring using nuclear magnetic resonance spectrum (NMR) when the polymer electrolyte material is soluble in the solvent. However, when the polymer electrolyte material is insoluble in the solvent, a method of measuring a solid $^{13}$C-CP/MAS nuclear magnetic resonance spectrum is preferably used as a quantitative method.

With respect to the amount of the protective group in the polymer electrolyte material, it is possible to refer to the measurement results of thermogravimetric analysis (TGA), analysis of an evolved gas through temperature programmed desorption or decomposition mass spectrometry (TPD-MS), thermal decomposition gas chromatograph, thermal decomposition GC-MS, and infrared absorption spectrum (IR).

For example, when the polymer electrolyte material contains the constituent unit of the general formula (P2) and $R_3$ is —$CH_2CH_2$—, at least a $C_2H_4O$ gas and/or a $C_4H_8O_2$ gas are detected by analysis of an evolved gas through temperature programmed desorption or decomposition mass spectrometry (TPD-MS). In the polymer electrolyte material of the present invention, the total amount of a $C_2H_4O$ gas and a $C_4H_8O_2$ gas is preferably 20% by weight or less based on the dry weight of the polymer electrolyte material. When resistance to solvents and mechanical properties are required, the total amount of the gas is more preferably 1% by weight or less, still more preferably 0.3% by weight or less, and most preferably 0.1% by weight or less. In case of using as a soluble polymer electrolyte material for forming, the total amount of the gas is more preferably 1% by weight or more and 20% by weight or less in view of solvent solubility.

The molecular weight of the resulting polymer used as the polymer electrolyte material is preferably from 1,000 to 5,000,000, and more preferably from 10,000 to 500,000, in terms of a polystyrene equivalent weight average molecular weight.

According to the method of the present invention, solubility is imparted to a polymer having crystallinity, and thus making it possible to obtain a uniform and tough membrane. As a result, it is possible to obtain a uniform and tough polymer electrolyte membrane which is excellent in fuel barrier properties and resistance to solvents.

Another aspect of the present invention is a polymer electrolyte material having a specific preferred structure. The polymer electrolyte material of the present invention contains at least an ionic group-containing polymer including constituent units represented by the following general formulas (Q1) and (Q3), namely, an aromatic polyetherketone-based polymer, and also a molar content of constituent units represented by the general formulas (Q1), (Q2) and (Q3) satisfies the following formula (S1):

[Chemical Formula 14]

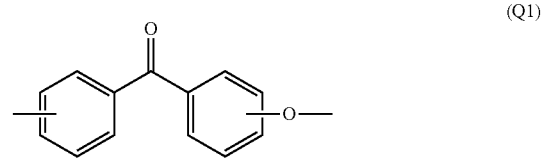

(Q1)

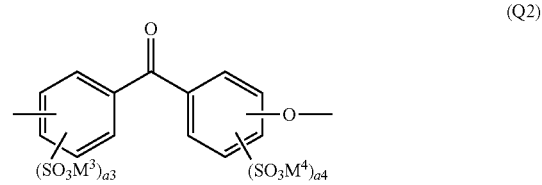

(Q2)

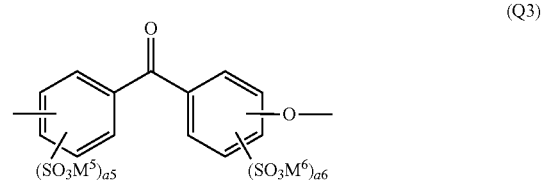

(Q3)

wherein a3 and a4 represent an integer satisfying the following equation: a3+a4=1, a5 and a6 represent an integer satisfying the following relational expression: $2 \leq a5+a6 \leq 8$, $M^3$ to $M^6$ represent a cation selected from hydrogen, a metal cation and an ammonium cation and, in the general formulas (Q1) to (Q3), a phenylene group may be substituted with an optional group excluding an ionic group, and $$0 \leq Y < Z < X < 1 \tag{S1}$$

wherein X, Y and Z represent a molar content of each structural unit based on a total molar amount of constituent units represented by the general formulas (Q1), (Q2) and (Q3), and also satisfy the following equation: $X+Y+Z=1$.

In the general formulas (Q1) to (Q3), a phenylene group may be substituted with an optional group excluding an ionic group, and a phenylene group having no substituent is preferable in view of crystallinity.

In the general formulas (Q1) to (Q3), the constituent unit represented by the general formula (Q1) is a component which exerts a high effect of improving mechanical strength, physical durability and resistance to solvents through crystallinity, and the constituent unit represented by the general formula (Q3) is a component which imparts proton conductivity, and these constituent units are particularly preferable constituent units in the present invention. However, the component represented by the general formula (Q2) serves as a component which does not exert a high effect of improving crystallinity and proton conductivity. It is not preferable to contain a large amount of the component because the resulting polymer electrolyte material is insufficient in mechanical strength, physical durability, proton conductivity and resistance to solvents.

The polymer electrolyte material satisfying the relational expression (S1) has high proton conductivity and is also excellent in resistances to solvents such as resistance to hot water and resistance to hot methanol, mechanical properties such as tensile strength, tear strength and resistance to fatigue, and fuel barrier properties because of small content of the constituent unit represented by the general formula (Q2) and large content of constituent units represented by the general formulas (Q1) and (Q3). Also, the polymer electrolyte material is excellent in chemical stability, namely, resistance to radical and resistance to oxidation.

In the prior art, a sulfonic acid group was introduced by subjecting a PEK polymer to a polymer reaction. However, according to such a method, it was necessarily required to contain a large amount of the constituent unit represented by the general formula (Q2). Namely, when sulfonation is carried out in the state where a large amount of constituent unit represented by the general formula (Q1) exists, the constituent unit represented by the general formula (Q2) was produced in the amount larger than that of the constituent unit represented by the general formula (Q3). Therefore, the following relational expression Y>Z is established and thus the composition represented by the relational expression (S1) in the present invention could not be achieved.

In the present invention, as described above, it is possible to obtain a polymer having accurately controlled amount and position of the ionic group to be introduced by reacting a dihydric phenol compound having a protective group represented by the general formula (P1-1) or (P2-1) with an aromatic active dihalide compound having an ionic group and subjecting the resulting polymer to the deprotection reaction.

In the above relational expression (S1), Y is preferably 0.1 or less, and most preferably 0.

In view of mechanical properties and physical durability, X is preferably 0.5 or more, and most preferably 0.7 or more.

Z is preferably 0.05 or more and 0.4 or less, and most preferably 0.1 or more and 0.3 or less.

The polymer electrolyte material preferably comprises the constituent units represented by the general formulas (Q1) and (Q3) in the amount of 50% by weight or more based on the polymer.

It is more preferred that the constituent unit represented by the general formula (Q3) is interposed between the constituent units represented by the general formula (Q1). When the constituent units represented by the general formula (Q3) are adjacent, mechanical strength, physical durability and resistance to solvents may become insufficient. The constituent unit represented by the general formula Q1 may be a constituent unit in which a ketone group is protected with a protective group.

The constituent unit represented by the general formula (Q1) is preferably a constituent unit represented by the following general formula (Q4). Also, the constituent unit represented by the following general formula (Q3) is preferably a constituent unit represented by the following general formula (Q5). It is advantageous that a phenylene group exists at the para-position and a sulfonic acid group regularly exists at a predetermined position because the resulting polymer electrolyte material has enhanced crystallinity and is excellent in mechanical strength, physical durability and resistance to solvents.

[Chemical Formula 15]

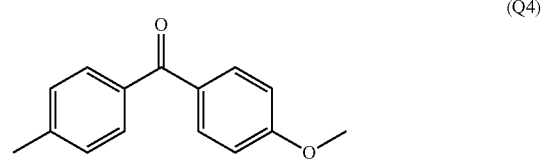

(Q4)

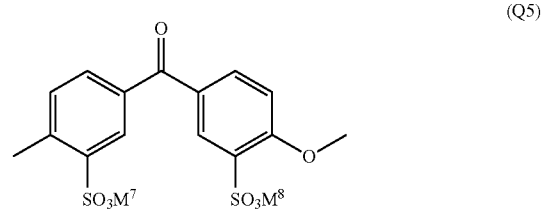

(Q5)

wherein $M^7$ and $M^8$ represent a cation selected from among a hydrogen ion, a metal cation and an ammonium cation.

In view of mechanical strength, physical durability, resistance to solvents and fuel barrier properties, a polymer electrolyte material comprising a constituent unit represented by the following general formula (Q6) and a constituent unit represented by the following general formula (Q7) is most preferable:

[Chemical Formula 16]

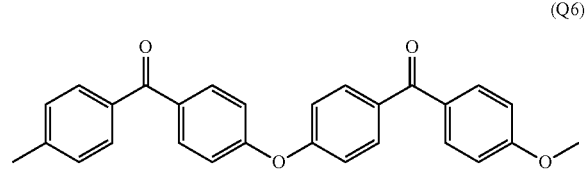

(Q6)

(Q7)

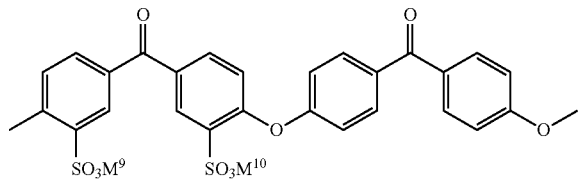

wherein $M^9$ and $M^{10}$ represent a cation selected from among a hydrogen ion, a metal cation and an ammonium cation.

A chemical structure of the polymer electrolyte material can be confirmed by S=O absorption at 1,030 to 1,045 $cm^{-1}$ and 1,160 to 1,190 $cm^{-1}$, C—O—C absorption at 1,130 to 1,250 $cm^{-1}$ and C=O absorption at 1,640 to 1,660 $cm^{-1}$ through infrared absorption spectrum. Also, the structure can be confirmed by a peak of an aromatic proton at 6.8 to 8.0 ppm through a nuclear magnetic resonance spectrum ($^{1}$H-NMR). Also, the position and arrangement of a sulfonic acid group can be confirmed through solution $^{13}$C-NMR and solid-state $^{13}$C-NMR.

The content and arrangement of the constituent units represented by general formulas (Q1) to (Q7) can be determined with specific reference to model-samples using $^{1}$H-NMR, solution $^{13}$C-NMR and solid-state $^{13}$C-NMR. In analyzing the comparison ratio, information of neutralization titration or elemental analysis of sulfonic acid groups can also be referred.

The amount of the sulfonic acid group in the polymer electrolyte can be represented as a value of density of a sulfonic acid group (mmol/g). In view of proton conductivity, fuel barrier properties, mechanical strength and physical durability, the density of the sulfonic acid group of polymer electrolyte is preferably from 0.1 to 5.0 mmol/g, more preferably from 0.5 to 2.5 mmol/g, and most preferably from 0.8 to 2.0 mmol/g in view of fuel barrier properties. In case of using as an electrolyte membrane for fuel cell, when the density of the sulfonic acid group is less than 0.1 mmol/g, sufficient power generation characteristic cannot be sometimes obtained because of low proton conductivity. When the density of the sulfonic acid group is more than 5.0 mmol/g, sufficient resistance to water and sufficient wet mechanical strength cannot be sometimes obtained.

As used herein, the density of the sulfonic acid group is the number of mols of sulfonic acid groups introduced per 1 g of dried polymer electrolyte, and as the value of the density increases, the amount of the sulfonic acid group increases. The density of the sulfonic acid group can be obtained by elemental analysis or neutralization titration. When the polymer electrolyte does not contain a sulfur source other than the sulfonic acid group, it is preferable that the density is calculated from a S/C ratio using an elemental analysis method because of ease of the measurement. However, when the polymer electrolyte contains a sulfur source other than the sulfonic acid group, it is preferable that the ion-exchange capacity is obtained by a neutralization titration method. The polymer electrolyte material of the present invention includes an aspect as a complex containing a component other than a polymer having an ionic group. In this case, the density of the sulfonic acid group is obtained based on the total amount of the complex.

The procedure of the neutralization titration is carried out as follows. The measurement is carried out three or more times and the obtained values are averaged.

(1) A sample is ground by a mill and screened through a net sieve #50 and the particles passed through the net sieve is used as a measuring sample. (2) A sample tube (with a cap) is weighed by precision balance. (3) About 0.1 g of the sample obtained in (1) is put in the sample tube and vacuum-dried at 40° C. for 16 hours. (4) The sample tube containing the sample was weighed to determine a dry weight of the sample. (5) Sodium chloride is dissolved in an aqueous 30 wt % methanol solution to prepare a saturated saline. (6) 25 mL of the saturated saline obtained in (5) is added to the sample, followed by ion exchange while stirring for 24 hours. (7) Hydrochloric acid produced is titrated using an aqueous 0.02 mol/L sodium hydrate solution. As an indicator, two drops of a commercially available phenolphthalein solution for titration (0.1% by volume) are added and it is judged as the end point when the solution shows a reddish purple color. (8) The density of the sulfonic acid group is determined by the following equation.

Density of sulfonic acid group (mmol/g)=[Concentration (mmol/ml) of aqueous sodium hydroxide solution×amount (ml)added dropwise]/Dry weight (g) of sample The polymer having an ionic group used in the present invention may contain other components such as inactive polymer or organic or inorganic compound which does not have electrical conductivity or ionic conductivity as long as the object of the present invention is not adversely affected.

In view of fuel barrier properties and an increase of energy capacity using a high concentration fuel, the polymer electrolyte material is preferably excellent in resistance to solvents. Specifically, weight loss of the polymer electrolyte material after dipping in N-methyl pyrrolidone at 100° C. for 2 hours is preferably 70% by weight or less. As the liquid fuel, alcohols such as methanol are often used. In the present invention, resistance to solvents is evaluated using N-methyl pyrrolidone having excellent solubility regardless of the kind of the polymer. Weight loss is more preferably 50% by weight or less, and most preferably 30% by weight or less. Weight loss of more than 70% by weight is not preferred because mechanical strength, physical durability, and long-term durability are insufficient because of insufficient fuel barrier properties and insufficient crystallinity. In case of using for DMFC in which an aqueous high-temperature and high-concentration methanol solution is used as the fuel, the membrane solves or swells drastically. Moreover, it becomes difficult to directly apply a catalyst paste on the polymer electrolyte membrane to produce a membrane electrode assembly, and thus not only production cost increases but also interface resistance with the catalyst layer increases and sufficient power generation characteristics may not be obtained.

Such weight loss of the polymer electrolyte material to N-methylpyrrolidone is measured by the method described in Examples described hereinafter.

Moreover, additives used in a conventional polymer compound, for example, crystallization nucleating agents, plasticizers, stabilizers, antioxidants, releasants, various polymers, elastomers, fillers and fine particles can be added as long as the object of the present invention is not adversely affected.

The polymer electrolyte of the present invention is preferably used as the polymer electrolyte molded article. The polymer electrolyte material of the present invention can be preferably used as the polymer electrolyte membrane, and the polymer electrolyte membrane will now be described in more detail.

The polymer electrolyte membrane can be produced by the above method for producing a molded article. If necessary, the obtained polymer electrolyte membrane can be protonated by optionally dipping in an aqueous acidic solution.

The polymer electrolyte membrane is preferably heat-treated before protonation. The temperature of the heat treatment is preferably from 150 to 550° C., more preferably from 160 to 400° C., and particularly preferably from 180 to 350° C. The time for heat treatment is preferably from 10 seconds to 12 hours, more preferably from 30 seconds to 6 hours, and particularly preferably from one minute to one hour. By the heat treatment under these conditions, the inhibitory effect of fuel crossover of the polymer electrolyte membrane, elastic modulus and breaking strength are improved.

In the polymer electrolyte membrane, the polymer structure can be optionally crosslinked by means such as irradiation with radiation. By crosslinking the polymer electrolyte membrane, fuel barrier properties, the inhibitory effect of swelling of the fuel and mechanical strength may be improved, more preferably. Irradiation with radiation includes, for example, irradiation with electron beam and irradiation with γ-ray.

The thickness of the polymer electrolyte is preferably from 1 to 2,000 μm. For the purpose of obtaining the strength suited for practical use, the thickness is preferably more than 1 μm. For the purpose of decreasing membrane resistance, namely, improving of power generation performances, the thickness is preferably less than 2000 μm. The thickness is more preferably from 3 to 500 μm, and particularly preferably from 5 to 250 μm. The thickness can be controlled by the concentration of the solution or the thickness of the coat on a substrate.

Moreover, additives used in a conventional polymer compound, for example, crystallization nucleating agents, plasticizers, stabilizers, antioxidants and releasants can be added to the polymer electrolyte membrane as long as the object of the present invention is not adversely affected.

As long as various properties of the present invention are not adversely affected, the polymer electrolyte membrane can contain various polymers, elastomers, fillers, fine particles and various additives for the purpose of improving mechanical strength, thermal stability and workability. Moreover, the membrane may be reinforced with a fine porous membrane, a nonwoven fabric or a mesh.

In the polymer electrolyte membrane, methanol crossover per unit area with respect to an aqueous 30 wt % methanol solution under the condition of 20° C. is 40 $\mu mol \cdot min^{-1} \cdot cm^{-2}$ or less. In the fuel cell using the polymer electrolyte membrane, high power and high energy capacity can be obtained in the region of high concentration of the fuel. To maintain high concentration of the fuel, excellent fuel barrier properties are required. Methanol crossover is measured after the polymer electrolyte membrane was dipped in pure water at 25° C. for 24 hours.

From such a point of view, methanol crossover is most preferably 0 $\mu mol \cdot min^{-1} \cdot cm^{-2}$, and is preferably 0.01 $\mu mol \cdot min^-$ in view of ensuring proton conductivity.

In the polymer electrolyte membrane of the present invention, methanol crossover per unit area and per unit thickness with respect to an aqueous 1 mol % methanol solution under the condition of 20° C. is 100 nmol/min/cm or less. Methanol crossover is more preferably 50 nmol/min/cm or less, and still more preferably 10 nm/min/cm or less. The reason is as follows. That is, in the fuel using the membrane of the polymer electrolyte material, it is desired that fuel crossover is small so as to maintain high concentration of the fuel in view of obtaining high power and high energy capacity in the region of high concentration of the fuel. In view of ensuring proton conductivity, fuel crossover is more preferably 0.01 nmol/min/cm or more.

In the polymer electrolyte membrane of the present invention, methanol crossover per unit area with respect to an aqueous 1 mol % methanol solution under the condition of 20° C. is preferably 5 $\mu mol/min/cm^2$ or less. The reason is as follows. That is, in the fuel using the membrane of the polymer electrolyte material, it is desired the fuel crossover is small so as to maintain high concentration of the fuel in view of obtaining high power and high energy capacity in the region of high concentration of the fuel. From such a view point, it is more preferable that the methanol crossover is 2 $\mu mol/min/cm^2$ or less. From the view point of ensuring the proton conductivity, 0.01 $nmol/min/cm^2$ or more is preferable.

In the polymer electrolyte membrane, the proton conductivity per unit area is preferably 1 $S \cdot cm^{-2}$ or more, and more preferably 2 $S \cdot cm^2$ or more. Proton conductivity can be measured by a potentiostatic AC impedance method comprising dipping a polymer electrolyte membrane in pure water at 25° C. for 24 hours and taking out the polymer electrolyte membrane in an atmosphere at a temperature of 25° C. and a relative humidity of 50 to 80%, followed by the measurement as soon as possible.

By adjusting proton conductivity per unit area to 1 $S \cdot cm^2$ or more, sufficient proton conductivity, namely, sufficient cell power can be obtained when the membrane is used as the polymer electrolyte membrane for fuel cell. The higher proton conductivity, the better. However, the membrane having high proton conductivity is likely to be dissolved or collapsed by the fuel such as methanol water and also fuel crossover may increase. Therefore, actual upper limit is 50 $S \cdot cm^{-2}$.

Moreover, the proton conductivity per unit area and per unit thickness is preferably 10 mS/cm or more, more preferably 20 mS/cm or more, and still more preferably 50 mS/cm or more. When proton conductivity per unit area and per unit thickness is 10 mS/cm or more, sufficient proton conductivity, namely, sufficient cell power can be obtained when the membrane is used as a polymer electrolyte membrane for fuel cell. The higher proton conductivity, the better. However, when proton conductivity is too high, the membrane having high proton conductivity is likely to be dissolved or collapsed by the fuel such as methanol water and also fuel crossover may increase. Therefore, actual upper limit is 5,000 $mS \cdot cm^{-2}$.

In the polymer electrolyte membrane, low methanol crossover and high proton conductivity as described above are preferably achieved at the same time so as to satisfy both high power and high energy capacity.

Another embodiment of the present invention is a polymer electrolyte membrane containing an ionic group-containing polymer in which Elmendorf tearing strength measured under an atmosphere at 23° C. and a relative humidity of 50% is 45 N/cm or more and 1,000 N/cm or less.

When the fuel cell of polymer electrolyte is operated under actual conditions, swelling and shrinkage corresponding to start/stop of the fuel cell are repeated. Conventionally, since the polymer electrolyte membrane requires high proton conductivity, it must contain a large amount of moisture. Under the condition where swelling and shrinking are repeated, there arises a problem that the membrane is broken because of insufficient mechanical strength or physical durability of the membrane. The present inventors have intensively studied and found it effective to improve a cohesive force of the polymer molecular chain so as to improve physical durability against swelling and shrinkage. Thus, they have focused on the tearing strength having a correlation with the cohesive force and found that long-term durability can be achieved when a polymer electrolyte type fuel cell is made using a polymer electrolyte membrane having a specific tearing strength.

Elmendorf tearing strength of the polymer electrolyte membrane is preferably 80 N/cm or more, and most preferably 120 N/cm or more, in view of physical durability. Elmendorf tearing strength of less than 45N/cm is not preferred because the membrane may be broken when used under the condition of continuous power generation for a long time and repetition of swelling and drying. The larger Elmendorf tearing strength, the better. However, as the strength increases, proton conductivity may decrease. Therefore, actual upper limit is 1,000 N/cm. Elmendorf tearing strength of the polymer electrolyte membrane is measured by the method described in Examples described hereinafter.

Another embodiment of the present invention is a polymer electrolyte membrane containing an ionic group-containing polymer in which tensile breaking strength under an atmosphere at 25° C. and a relative humidity of 60% is 80 MPa or more and 1,000 MPa or less and tensile breaking elongation is from 100% or more and 1,000% or less.

The present inventors has intensively studied and found that a membrane, which is excellent in tensile breaking strength out of mechanical strength and tensile rupture elongation, is required to achieve long-term stability under actual conditions when a polymer electrolyte type fuel cell is produced.

The tensile breaking strength of the polymer electrolyte is preferably 100 MPa or more, and most preferably 120 MPa or more. The larger the tensile breaking strength, the better. However, as the strength increases, interface resistance with the catalyst layer may increase. Therefore, actual upper limit is 1,000 MPa. Moreover, the tensile rupture elongation is preferably 250% or more, and more preferably 350% or more. The tensile breaking strength under an atmosphere at 25° C. and a relative humidity of 60% is most preferably 120 MPa or more and 1,000 MPa or less and the tensile rupture elongation is most preferably 350% or more and 1,000% or less. The tensile breaking strength of less than 80 MPa is not preferred because membrane breakage is likely to be caused by a decrease in thickness because of insufficient resistance to creep. The tensile rupture elongation of less than 100% is not preferred because the membrane may be broken when used under the condition of continuous power generation for a long time and repetition of swelling and drying.

In the polymer electrolyte membrane, in view of long-term durability, tensile elastic modulus under an atmosphere at 25° C. and a relative humidity of 60% is preferably 0.8 GPa or more and 5 GPa or less, more preferably 1 GPa or more and 3 GPa or less, and most preferably 1.2 GPa or more and 2.5 GPa or less. When the tensile elastic modulus is less than 0.8 GPa, long-term durability may become insufficient because of poor resistance to creep. When the tensile elastic modulus is more than 5 GPa, adhesion to the catalyst layer may decrease or the membrane is likely to be broken because of insufficient toughness.

In the polymer electrolyte membrane, tensile yield strength under an atmosphere at 25° C. and a humidity of 60% is preferably 30 MPa or more, and more preferably 50 MPa or more. When the tensile yield strength is less than 30 MPa, long-term durability may become insufficient because of poor resistance to creep and the membrane may be broken when used under the condition of continuous power generation for a long time and repetition of swelling and drying.

The tensile breaking strength, tensile breaking elongation, tensile elastic modulus and tensile yield strength of the polymer electrolyte membrane can be determined by the measurement of the tensile strength and elongation. The measurement of the tensile strength and elongation is carried out by the method described in Examples described hereinafter.

The polymer electrolyte material or the polymer electrolyte molded article of the present invention can be applied to various purposes. For example, the polymer electrolyte material or the polymer electrolyte molded article can be applied to medical purposes such as extracorporeal circulation column and artificial skin, purposes for filtration, purposes for ion exchange resin, purposes for various structural materials, and electrochemical purposes. Moreover, the polymer electrolyte material or the polymer electrolyte molded article is suited for artificial muscle. Among these purposes, the polymer electrolyte material or the polymer electrolyte molded article can be more preferably used for various electrochemical purposes. The electrochemical purposes include, for example, a fuel cell, a redox flow cell, a water electrolysis apparatus, and a chloroalkali electrolysis apparatus. Among these purposes, a fuel cell is most preferable.

When the polymer electrolyte material of the present invention is used for fuel cell, the material can be particularly preferably used as a binder of the polymer electrolyte membrane or the catalyst layer.

The polymer electrolyte material or the polymer electrolyte molded article of the present invention can be preferably used for polymer electrolyte parts. The polymer electrolyte parts are parts using the polymer electrolyte material or the polymer electrolyte molded article. The polymer electrolyte parts include assembly with a material except for the polymer electrolyte material or the polymer electrolyte molded article, such as a membrane electrode assembly. The membrane electrode assemblies are parts in which the polymer electrolyte membrane and an electrode are assembled.

The method for joining a polymer electrolyte membrane with an electrode when the membrane electrode assembly is used for fuel cell is not specifically limited, and known methods (for example, chemical plating method described in Electrochemistry, 1985, 53, p. 269, and thermal press-bonding method by a gas diffusion electrode, described in Electrochemical Science and Technology, edited by J. Electrochem. Soc., 1988, 135, 9, p. 2209) are applicable thereto.

In case of integrating using a hot press, the temperature and the pressure are appropriately selected according to the thickness of the polymer electrolyte membrane, the moisture content, the catalyst layer or the electrode substrate. Moreover, in the present invention, assembling can be carried out by press even if the polymer electrolyte membrane is dried or the membrane is water-absorbed. Specific examples of the press method includes roll press in which the pressure and the clearance are defined, and flat plate press in which the pressure is defined. It is preferable that press is carried out at a temperature within a range of from 0 to 250° C. in view of industrial productivity, inhibition of thermal decomposition of the polymer electrolyte material having an ionic group. It is preferable that the pressure is as small as possible in view of protection of the polymer electrolyte membrane and the electrode. In the case of the flat plate press, the pressure is preferably 10 MPa or less. It is one of preferable selection choices in view of prevention of short-circuit of anode and cathode electrodes to laminate an electrode and a polymer electrolyte membrane to form a fuel cell without assembling through a hot press process. In case of this method, when power generation is repeated as the fuel cell, deterioration of the polymer electrolyte membrane, which is considered to be caused by the short-circuited portion, may be inhibited and durability as a fuel cell is improved.

Moreover, in case of hot pressing at a temperature higher than a softening temperature or a glass transition temperature of the polymer electrolyte material, when the temperature is close to the decomposition temperature of the ionic group, it is difficult to adopt the temperature higher than the softening temperature or the glass transition temperature of the polymer electrolyte material. However, when the ionic group is converted into a metal salt thereby inhibiting decomposition, hot press can be carried out at a temperature higher than the softening temperature or the glass transition temperature of the polymer electrolyte material. For example, when the ionic group of the binder in the electrode or the polymer electrolyte material such as the polymer electrolyte membrane is a sulfonic acid group, the ionic group is converted into a sodium sulfonate and, after joining by hot press, protonation is carried out using hydrochloric acid or sulfuric acid to produce a membrane electrode assembly.

Moreover, it is also a preferable method to interpose a low interface-resistance layer between an electrode and a polymer electrolyte membrane upon assembling of the electrode and the polymer electrolyte membrane. By filling at least a portion of fine space between the electrode and the polymer electrolyte membrane with the low interface-resistance layer, the contact area between the electrode and the polymer electrolyte membrane can be substantially increased. Also, an increase in resistance due to introduction of a fuel, air, and water produced or carbon dioxide can be prevented. Moreover, the low interface-resistance layer penetrates into cracks formed in the catalyst layer of the electrode, and thus it becomes possible to effectively utilize the inner wall surface of cracks in the catalyst which has never been used for power generation, and the contact area between the polymer electrolyte and the catalyst can be increased. As a result, resistance of the membrane electrode assembly decreases and the power density becomes large and thus and a fuel cell of high performance can be obtained. Furthermore, the projection of the electrode substrate or the catalyst layer can also be coated and thus minor short circuit in the production of the membrane electrode assembly or minor short circuit during use as the fuel cell can be reduced, and also the effect capable of inhibiting deterioration of performance of the membrane electrode assembly can be expected. Furthermore, even when the polymer electrolyte membrane includes pinholes or surface defects, it is possible to protect or repair with the low interface-resistance layer, and to stabilize performances and to improve durability of the membrane electrode assembly.

The material used in the low interface-resistance layer is not specifically limited as long as it has ionic conductivity and durability against the fuel to be used. It is particularly preferable to contain the polymer electrolyte material obtained in the present invention in view of mechanical strength, physical durability and resistance to fuels. For example, in case of assembling the membrane electrode, a composition comprising a polymer electrolyte precursor having a protective group and an ionic group of the present invention, a solvent and a plasticizer is used as a precursor of the low interface-resistance layer and, after assembling the membrane electrode, the solvent and the plasticizer are removed by drying or extraction cleaning to obtain a high performance membrane electrode assembly having both reduced interfacial resistance, mechanical strength and fuel barrier properties. In this case, the low interface-resistance layer precursor may be formed in the side of the electrode or the side of the polymer electrolyte membrane before the assembling step.

Next, an example of an electrode suited for the membrane electrode assembly will be explained. Such an electrode is composed of the catalyst layer and the electrode substrate. As used herein, the catalyst layer is a layer containing a catalyst for promoting an electrode reaction, an electron conductor and an ionic conductor. As the catalyst contained in the catalyst layer, a catalyst made of a noble metal such as platinum, palladium, ruthenium, rhodium, iridium or gold is preferably used. These catalysts may be used alone or used in combination as an alloy or a mixture.

Moreover, when the electron conductor (conductive material) is used in the catalyst layer, a carbon material and an inorganic conductive material are preferably used in view of electron conductivity and chemical stability, and examples thereof include amorphous or crystalline carbon materials. Carbon black such as channel black, thermal black, furnace black or acetylene black is preferably in view of electron conductivity and specific surface area. The furnace black includes Balkan® XC-72R, Balkan® P, Black Pearls® 1300, Black Pearls® 2000, and Regal® 4000, which are manufactured by Cabot Co., Ltd., and Ketjen Black® EC and EC600JD, which are manufactured by Ketjen Black International Corporation, and #3150, and #3250, which are manufactured by Mitsubishi Chemical Corporation. The acetylene black includes Denka Black® manufactured by Denki Kagaku Kogyo Co., Ltd. In addition to the carbon black, natural graphite and artificial graphite or carbon obtained from an organic compound such as pitch, coke, polyacrylonitrile, phenol resin and fran resin are also used. These carbon materials to be used are in the form of indeterminate particle, fiber, scale, tube, cone and megaphone. Moreover, these carbon materials may be used after subjecting to a post-processing.

In case of using an electron conductor, it is preferable that the electron conductor is dispersed uniformly with catalyst particles in view of electrode performance. Therefore, it is preferable that the catalyst particles and the electron conductor are preliminarily dispersed sufficiently to form a coating solution. Furthermore, it is also preferable embodiment to use a catalyst-supporting carbon obtained by integrating a catalyst with an electron conductor as the catalyst layer. By using the catalyst-supporting carbon, use efficiency of the catalyst is improved and it is possible to contribute to an improvement of the cell performance and cost reduction. Even when the catalyst supporting carbon is used in the catalyst layer, a conductive agent can also be added so as to further enhance electron conductivity. As the conductive agent, the above carbon black is preferably used.

As the material having ionic conductivity used in the catalyst layer (ionic conductor), various organic materials and inorganic materials are known. However, in case of using for fuel cell, a polymer having an ionic group such as sulfonic acid group, carbonic acid group or phosphoric acid group for improving ionic conductivity (ionic conductive polymer) is preferably used. Among them, in view of stability of the ionic group, it is preferable to use a polymer having ionic conductivity composed of a fluoroalkyl ether side chain and a fluoroalkyl main chain, a known hydrocarbon-based polymer electrolyte material, or a polymer electrolyte material of the present invention. As the perfluoro-based ionic conductivity polymer, it is preferable to use, for example, NAFION® manufactured by DuPont Co., Aciplex® manufactured by Asahikasei Co., Ltd., Flemion® manufactured by Asahi Glass Co., Ltd. Such ionic conductive polymer is provided in the catalyst layer in the state of a solution or a dispersion solution. In this case, the solvent for dissolving or dispersing the polymer is not specifically limited. However, the polar solvent is preferable in view of solubility of the ionic conductive polymer. As the ionic conductor, the polymer electrolyte material of the present invention is most preferably used. In case of the fuel cell using an aqueous methanol solution or methanol as the fuel, the polymer electrolyte material obtained in the present invention is effective for durability in view of resistance to methanol. The polymer electrolyte precursor of the present invention is processed in the stage of the soluble polymer electrolyte material for forming to give MEA, and then deprotected to impart resistance to solvents, and thus making it possible to prepare an excellent binder having both workability and resistance to solvents.

The catalyst and the electronic conductors are usually powders and therefore, the ionic conductor has a role of fixing them. It is preferable that the ionic conductor is preliminarily added to a coating solution containing the catalyst particles and the electron conductor as main constituent substances and coated in the state of being uniformly dispersed in view of the electrode performance. The amount of the ionic conductor contained in the catalyst layer should be appropriately determined according to required electrode characteristics or conductivity of the ionic conductor used, and is not specifically limited, but is preferably from 1 to 80% by weight, and more preferably from 5 to 50%. The ionic conductor may deteriorate the electrode performance in both cases that ionic conductivity is low when the amount of the conductor is too small and that gas permeability is inhibited when the amount of the conductor is too large.

The catalyst layer may contain various substances, in addition to the above catalysts, electron conductors and ionic conductors. To enhance a binding property of substances contained in the catalyst layer, the polymer except for the above ionic conductive polymer may be contained. As such a polymer, it is possible to use polymers having a fluorine atom such as polyvinyl fluoride (PVF), polyvinylidene fluoride (PVDF), polyhexafluoropropylene (FEP), polytetrafluoroethylene, and polyperfluoroalkylvinyl ether (PFA), copolymers of them, copolymers of monomer units constituting the polymers and other monomers such as ethylene or styrene, or blend polymers. It is preferable that the content in the catalyst layer of these polymers is from 5 to 40% by weight. If the polymer content is too large, electronic and ionic resistances are improved and the electrode performance may deteriorate.

When the fuel is a liquid or a gas, it is preferable that the catalyst layer has a structure that the liquid or the gas easily permeates, and the structure of promoting discharge of by-products along with the electrode reaction is preferable.

The electrode substrate having low electric resistance and being capable of current collection and power feeding can be used. When the catalyst layer serving also as the current collector is used, the electrode substrate is not used. The structural material of the electrode substrate includes, for example, carbonaceous materials, conductive inorganic materials such as sintered body obtained from polyacrylonitrile, sintered body obtained from pitch, carbon material such as graphite and expanded graphite, stainless steel, molybdenum and titanium. The form of the electrode substrate is not specifically limited and includes fiber or particle. However, a fiber-like conductive material (conductive fiber) such as carbon fiber is preferable in view of fuel crossover. As the electrode substrate using the conductive fiber, both woven and nonwoven fabrics can be used. For example, Carbon paper TGP series or SO series manufactured by Toray Industries, Inc., and the carbon cross manufactured by E-TEK Co., Ltd. can be preferably used. The woven fabrics such as plain-woven, twill-woven, sateen-woven, figured-textile-woven and tapestry-woven fabrics can be used without any limitation. Moreover, the nonwoven fabrics produced by a paper-making method, a needle punching method, a span bonding method, a water-jet punching method, or a melt blowing method are used without any limitation. Moreover, a textile is possible. In these clothes, particularly in the case of using carbon fiber, it is preferable to use a woven fabric in which plain-woven fabric using flame-proof spun yarn is carbonized or graphitized, a nonwoven fabric in which the flame-proof spun yarn is subjected to a nonwoven process by a needle punching method or by a water jet punching method and then carbonized or graphitized, a mat nonwoven fabric produced by paper-making method using flame-proof spun yarn or carbonized yarn or graphitized yarn. In particular, it is preferable to use a nonwoven fabric because a thin and strong cloth can be obtained.

Such a carbon fiber used in the electrode substrate includes polyacrylonitrile (PAN)-based carbon fiber, phenol-based carbon fiber, pitch-based carbon fiber, and rayon-based carbon fiber.

Such an electrode substrate can be subjected to a water-repellent treatment so as to prevent deterioration of gas diffusion and permeability due to water retention, partial water-repellent or hydrophilizing treatment for forming an exhaust passage of water, or addition of carbon powders for decreasing the resistance. Between the electrode substrate and the catalyst layer, a conductive intermediate layer containing at least an inorganic conductive material and a hydrophobic polymer can also be provided. In case the electrode substrate is a carbon fiber fabric or a nonwoven fabric which has a large void ratio, deterioration of performances due to penetration of the catalyst to the electrode substrate can be inhibited by providing a conductive intermediate layer.

The polymer electrolyte material of the present invention is suited for a polymer electrolyte fuel cell among fuel cells. Examples thereof include fuel cells in which hydrogen or an organic compound such as methanol is used as the fuel, and the material is particularly preferably used in a direct-type fuel cell in which at least one selected from the organic compounds having 1 to 6 carbon atoms and mixtures of water and these compounds is used as the fuel. As the organic compound having 1 to 6 carbon atoms, it is preferable to use an alcohol having 1 to 3 carbon atoms such as methanol, ethanol, and isopropyl alcohol, or dimethylether, and methanol is most preferably used.

The fuel of the fuel cell includes oxygen, hydrogen, an organic compound having 1 to 6 carbon atoms such as methane, ethane, propane, butane, methanol, isopropyl alcohol, acetone, glycerin, ethylene glycol, formic acid, acetic acid, dimethyl ether, hydroquinone, or cyclohexane, and a mixture of water of the compound, and these fuels may be used alone or in combination. In view of power generation efficiency and the system simplification of the entire cell, hydrogen and a fuel containing an organic compound having 1 to 6 carbon atoms can be preferably used. In view of power generation efficiency, hydrogen and an aqueous methanol solution are particularly preferably used. In case of using an aqueous methanol solution, the concentration of methanol is appropriately selected according to the system of the fuel cell. However, the concentration is preferably as high as possible in view of long-term operation. For example, in the active-type fuel cell having an auxiliary machine such as a system of supplying a required medium for power generation to the membrane electrode assembly such as a liquid supply pump or a blower fan, a cooling fan, a fuel diluting system and a product recovery system, it is preferable that the fuel having the methanol concentration of 30 to 100% or more is injected from a fuel tank or a fuel cassette, diluted to about 0.5 to 20% and then supplied to the membrane electrode assembly. A fuel having a methanol concentration of 10 to 100% is preferable for a passive-type fuel cell having no auxiliary machine.

EXAMPLES

The present invention will now be described by way of examples, but the present invention is not limited to the following examples. Measuring conditions of the respective physical properties are as follows.
(1) Density of Sulfonic Acid Group A sample of a membrane as a specimen was dipped in pure water at 25° C. for 24 hours and, after vacuum drying at 40° C. for 24 hours, elemental analysis was carried out. Analysis of carbon, hydrogen and nitrogen was carried out by a full automatic elemental analysis apparatus varioEL, analysis of sulfur was carried out by flask combustion method and titration with barium acetate, and analysis of fluorine was carried out by flask combustion and ion chromatogram methods. Density (mmol/g) of sulfonic acid group per unit gram was calculated from a composition ratio of a polymer.
(2) Proton Conductivity A sample of a membrane was dipped in an aqueous 30 wt % methanol solution at 25° C. for 24 and taken out in an atmosphere at 25° C. and a relative humidity of 50 to 80%, and then proton conductivity was measured as quick as possible using a potentiostatic AC impedance method. The proton conductivity thus measured is referred to as proton conductivity A.

Separately, a sample of a membrane was dipped in pure water at 25° C. for 24 and taken out in an atmosphere at 25° C. and a relative humidity of 50 to 80%, and then proton conductivity was measured as quick as possible using a potentiostatic AC impedance method. The proton conductivity thus measured is referred to as proton conductivity B.

As a measuring apparatus, an electrochemical measuring system manufactured by Solartron (Solartron 1287 Electrochemical Interface and Solartron 1255B Frequency Response Analyzer). The sample was interposed between two circular electrode (made of stainless steel) each having a diameter of 2 mm and 10 mm by applying a load of 1 kg. An effective electrode surface was 0.0314 $cm^2$. An aqueous 15% solution of poly(2-acrylamide-2-methylpropanesulfonic acid) was applied on an interface between the sample and an electrode. At 25° C., potentiostatic impedance in a thickness direction was measured at AC amplitude of 50 mV.
(3) Weight Average Molecular Weight A weight average molecular weight of a polymer was measured by GPC. As an integrated-type apparatus of an ultraviolet detector and a differential refractometer, HLC-8022GPC manufactured by TOSOH Corporation was used. Using two TSK gel SuperHM-H (inner diameter: 6.0 mm, length: 15 cm) manufactured by TOSOH Corporation as a GPC column, a polystyrene equivalent weight average molecular weight was measured at a flow rate of 0.2 mL/min, using a N-methyl-2-pyrrolidone solvent (a N-methyl-2-pyrrolidone solvent containing 10 mmol/L of lithium bromide).
(4) Resistance to Hot Water and Resistance to Hot Methanol Resistance to hot water and resistance to hot methanol of an electrolyte membrane were evaluated by measuring a dimensional change ratio in an aqueous 30 wt % methanol solution at 60° C. The electrolyte membrane was cut into strips having a length of about 5 cm and a length of about 1 cm and, after dipping in water at 25° C. for 24 hours, the length (L1) of each strip was measured by a caliper. The electrolyte membrane was dipped in an aqueous 30 wt % methanol solution at 60° C. for 12 hours and the length (L2) was measured again by a caliper, and then the dimensional change was visually observed.
(5) Membrane Thickness Using Model ID-C112 manufactured by Mitutoyo Corporation set to Granite-Comparator Stand BSG-20 manufactured by Mitutoyo Corporation.
(6) Nuclear Magnetic Resonance Spectrum (NMR)

Under the following conditions, $^1$H-NMR was measured and the structure was confirmed, and then a mixing ratio of 4,4'-dihydroxybenzophenone to 2,2-bis(4-hydroxyphenyl)-1,3-dioxolane was determined. The mixing ratio (mol %) was calculated from an integrated value of a peak at 7.6 ppm (attributed to 4,4'-dihydroxybenzophenone) and a peak at 7.2 ppm (attributed to 2,2-bis(4-hydroxyphenyl)-1,3-dioxolane).

Apparatus: EX-270 manufactured by JEOL Ltd.
Resonant frequency: 270 MHz ($^1$H-NMR)
Measuring temperature: room temperature
Dissolution solvent: DMSO-d6
Internal standard substance: TMS (0 ppm)
Number of times of integration: 16 times Under the following conditions, a solid $^{13}$C-CP/MAS spectrum was measured and it was confirmed whether or not a ketal group is remained.

Apparatus: CMX-300Infinity manufactured by Chemagnetics Co.
Measuring temperature: room temperature
Internal standard substance: Sirubber (1.56 ppm)
Measuring nucleus: 75.188829 MHz
Pulse width: 90° pulse, 4.5 μsec
Pulse repeating hours: ACQTM=0.03413 sec, PD=9 sec
Spectrum width: 30.003 kHz
Sample rotation: 7 kHz
Contact time: 4 msec
(7) Methanol Crossover A membrane-shaped sample was dipped in hot water at 25° C. for 24 hours and the measurement was carried out using an aqueous 1 mol % methanol solution at 20° C.

A sample membrane was interposed between H-shaped cells and pure water (60 mL) was charged in one cell, while an aqueous 1 mol % methanol solution (60 mL) was charged in the other cell. Each cell had a capacity of 80 mL. An area of an opening between the cells was 1.77 $cm^2$. Both cells were stirred at 20° C. At the time when one hour, 2 hours and 3 hours have passed, an amount of methanol eluted in pure water was determined by measuring using Shimadzu Corporation gas chromatography (GC-2010). Methanol crossover per unit time was determined from a gradient of a graph.
(8) Wide Angle X-Ray Diffraction A polymer electrolyte material as a specimen was set to a diffractometer and X-ray diffraction was carried out under the following conditions.

X-ray diffractometer: RINT2500V manufactured by Rigaku Corporation
X-ray: Cu—K∞
X-ray output: 50 kV-300 mA
Optical system: concentration optical system
Scan speed: 2θ=2°/min
Scan method: 2θ-θ.
Scan range: 2θ=5 to 60°.
Slit: divergence slit—1/2°, light receiving slit—0.15 mm, scattering slit—1/2°.

Crystallinity was determined as follows: That is, each component was separated by profile fitting and a diffraction angle and an integrated intensity of each component were determined, and then crystallinity was calculated from a calculation equation of the general formula (S2) using an integrated intensity of the resulting crystalline peak and amorphous halo.

$$\text{Crystallinity (\%)} = (\text{Sum of integrated intensity of entire crystalline peak})/(\text{Sum of integrated intensity of entire crystalline peak and amorphous halo}) \times 100 \quad (S2)$$

(9) Weight Loss to N-Methyl Pyrrolidone

A polymer electrolyte membrane (about: 0.1 g) as a specimen was sufficiently washed with pure water and vacuum-dried at 40° C. for 24 hours, and then the weight was measured. The polymer electrolyte membrane was dipped in a 100-fold amount of N-methylpyrrolidone, followed by heating with stirring in a closed vessel at 100° C. for 2 hours. Then, filtration was carried out using a filter paper (No. 2) manufactured by Advantech Co., Ltd. Upon filtration, the filter paper and the residue were washed with a 1,000-fold amount of the same solvent and the effluent was sufficiently eluted in the solvent, and then N-methylpyrrolidone contained in the residue was sufficiently washed with pure water. The residue was vacuum-dried at 40° C. for 24 hours and the weight was measured, and then weight loss was calculated.

(10) Analysis (TPD-MS Measurement) of Residual Amount of Ketal Group

A polymer electrolyte material as a specimen was subjected to analysis of a gas generated upon heating under the following conditions, and then the residual amount of the ketal group was determined from the sum of $C_2H_4O$ (m/z=29) and 2-methyl-1,3-dioxolane (m/z=73).

A. Apparatus Used
TPD-MS apparatus
<Main Specification>
Heating Portion: Heater manufactured by TRC (electric heater type heating furnace, quartz glass reaction tube)
MS portion: GC/MS QP5050A manufactured by Shimadzu Corporation B. Test Conditions
Heating temperature conditions: room temperature to 550° C. (temperature raising rate: 10° C./min)
Atmosphere: He gas flow (50 mL/min) (manufactured by Iwatani International Corporation, purity: 99.995%)

C. Sample
Amount of sample used: about 1.5 mg
Pretreatment: 80° C., 180 minutes vacuum drying D. Reference Standard
Sodium tungstate dehydrate ($H_2O$ standard sample): SIGMA-ALDRICH Corp., guaranteed 99%
1-butene (organic component standard sample: GL Science, 7.92%/$N_2$ balance
Carbon dioxide: GL Science, 99.9%
Sulfur dioxide: SUMITOMO SEIKA CHEMICALS CO., LTD., 1.000%/$N_2$ balance
Phenol: Wako Pure Chemical Industries, Ltd., guaranteed 99.0%
2-methyl-1,3-dioxolane ($C_2H_4O$ and 2-methyl-1,3-dioxolane standard sample): Tokyo Chemical Industry Co., Ltd., guaranteed 98%

E. Temperature of Measuring Room (Range in Room Temperature)
23±2° C.

(11) Presence or Absence of Crystallization Peak and Measurement of Crystallization Calorie A polymer electrolyte material (3.5 to 4.5 mq) as a specimen was preliminarily dried at a temperature at which sulfonic acid group is not decomposed (for example, 40 to 100° C.) to remove moisture, and then the weight is measured. In this case, since there is a possibility that a chemical structure and a conformational structure of the polymer vary, the temperature should not raised to the temperature higher than the crystallization temperature or thermal decomposition temperature. After measuring the weight, the polymer electrolyte material was subjected to temperature modulation differential scanning calorimetry in a first temperature rising stage under the following conditions.

DSC apparatus: DSC Q100 manufactured by TA Instruments Co.
Measuring temperature range: 25° C. to thermal decomposition temperature (for example, 310° C.)
Temperature raising rate: 5° C./min
Amplitude: ±0.796° C.
Amount of sample: about 4 mg
Sample pan: crimp pan made of aluminum
Measuring atmosphere: nitrogen, 50 ml/min
Preliminary drying: vacuum drying at 60° C. for one hour A value obtained by duplicating calorie from the low temperature side to a peak top was calculated as a crystallization calorie. Since the specimen contained moisture, the moisture content was calculated from detected evaporation calorie of moisture and then the weight of the polymer electrolyte material was corrected. Evaporation calorie of water is 2277 J/g.

Weight (g) of moisture in sample=evaporation calorie (J/g) of moisture of sample×amount (g) of sample/2277 (J/g)

Crystallization Calorie Correction Value (J/g)=Crystallization Calorie (J/g)×Amount (g) of Sample/(Amount of Sample-Weight (g) of Moisture in Sample)

(12) Measurement of Elmendorf Tearing Strength

A polymer electrolyte membrane as a specimen was allowed to stand at 25° C. and 50% RH for 24 hours and set to an apparatus, and then Elmendorf tearing strength was measured under the following conditions in accordance with JIS-K7128.

Measuring apparatus: Elmendorf tear testing machine (manufactured by TOYO SEIKI Co., Ltd.)
Testing load: FS=100 g
Test piece: 63 mm in width×76 mm in length
Testing temperature: 25° C., 50% RH
Testing number: n=5
Number of plate laminated: 1

Elmendorf tearing strength was calculated by averaging the results of test carried out 5 times. In order to remove an influence of the thickness of a membrane, Elmendorf tearing strength was expressed as tear strength per unit membrane thickness. The membrane has anisotropy in tear strength, the measurement is carried out in two directions, which perpendicularly intersect each other, and the resulting average is inscribed as tear strength. Since no anisotropy was recognized in the membranes of the present example, only data in one direction were inscribed.

(13) Measurement of Tensile Strength

A polymer electrolyte membrane as a specimen was allowed to stand at 25° C. and 60% RH for 24 hours and set to an apparatus, and then tensile strength was measured under the following conditions. Tensile strength was calculated by averaging the results of test carried out 5 times.

Measuring apparatus: Model SV-201, Tensile&Compression Testing Machine (manufactured by IMADA SEISAKUSHO CO., LTD.)

Load: 50 N
Testing speed: 10 mm/min
Test piece: 5 mm in width×50 mm in length
Sample distance: 20 mm
Testing temperature: 25° C., 60% RH
Testing number: n=5

(14) Evaluation of Properties of Membrane Electrode Assembly

A. Voltage Retention

A membrane electrode assembly was assembled into a single cell "EFC05-01SP" (cell for electrode surface of 5 cm$^2$) manufactured by ElectroChem Inc. and, after adjusting cell temperature to 50° C., an aqueous 20% methanol solution was supplied to an anode side at a rate of 0.2 ml/min, while synthetic air was applied to a cathode side at a rate of 50 ml/min. Using an evaluation apparatus manufactured by TOYO Corporation, a potentiostat 1470 manufactured by Solartron, and Frequency Response Analyzer 1255B manufactured by Solartron, voltage-current characteristics were measured and a voltage at a current density of 250 mA/cm$^2$ was read. While repeating a cycle of including stop of power generation for one hour each 5 hours, an operation was carried out at a constant current of 250 mA/cm$^2$ for 100 hours in total. After the evaluation of the constant current, a voltage at a current density of 250 mA/cm$^2$ was read from a current-voltage curve and a retention rate from the first time was calculated.

B. Measurement of Fuel (Methanol) Crossover (Hereinafter Referred Sometimes to as "MCO")

Synthetic air discharged from a cathode before applying a current was collected in a bag for gas collection, and concentrations of methanol and carbon dioxide to be produced by oxidation, which are contained in a sampling gas, were measured and calculated using a gas chromatograph equipped with an autosampler "MicroGC CP4900" manufactured by GL Sciences Inc. It was assumed that entire carbon dioxide is generated from the crossovered methanol. MCO was calculated by the following equation:

$$MCO(mol/cm^2/min)=(L+V)\times(Z/100)/22400/A$$

where an air flow rate of a cathode denotes L (ml/min), total concentration of methanol and carbon dioxide determined by gas chromatograph denotes Z (volume %), a total volume denotes V (ml), and an opening area (with which an aqueous methanol solution fuel in a membrane electrode assembly is directly contacted) denotes A (cm$^2$).

C. Evaluation of Power Generation (Methanol/Water Fuel)

In a state where 30 wt % methanol/water was filled in an anode, the measurement was carried out using an evaluation apparatus manufactured by TOYO Corporation, a potentiostat 1470 manufactured by Solartron and Frequency Response Analyzer 1255B manufactured by Solartron. At a current-sweep rate of 10 mV/min, the measurement was obtained through division of a point, at which a product of a current and a voltage of a current-voltage curve becomes maximum, by an electrode surface was taken as power density.

D. Evaluation of Power Generation (Hydrogen Fuel)

Using a fuel cell, current-voltage (I-V) was measured under the following conditions of a cell temperature of 60° C., a fuel gas: of hydrogen, an oxidizing gas of air, gas utilization efficiency of anode (70%)/cathode (40%), and humidity of anode (90%)/cathode (90%). The value obtained through division of a point, at which a product of a current and a voltage of a current-voltage curve becomes maximum, by an electrode surface was taken as power density.

Synthesis Example 1

2,2-bis(4-hydroxyphenyl)-1,3-dioxolane represented by the following general formula (G1) was synthesized.

[Chemical Formula 17]

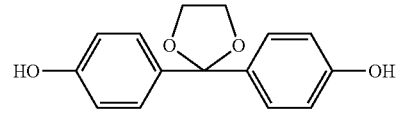

(G1)

In a flask equipped with a stirring blade and a thermometer, montmorillonite clay K10 (750 g) and 495 g of 4,4'-dihydroxybenzophenone were charged, and the atmosphere in the flask was replaced by nitrogen. 1,200 mL of ethylene glycol and 500 mL of methyl orthoformate were added and the reaction was carried out at a bath temperature of 110° C. for 8 hours while distilling off by-products produced. 500 mL of methyl orthoformate was added, followed by the reaction for 8 hours, namely, 16 hours in total. The reaction solution was diluted by adding 1 L of ethyl acetate and clay was removed by filtration, and then solution was extracted with an aqueous 2% sodium hydrogen carbonate solution four times. The extract solution was concentrated and the resulting slurry-like compound was washed with dichloroethane to obtain a 2,2-bis(4-hydroxyphenyl)-1,3-dioxolane/4,4'-dihydroxybenzophenone mixture (=85.5/14.5 mol %). The structure was confirmed by $^1$H-NMR. Other impurities could not be recognized by gas chromatography.

Synthesis Example 2

Disodium 3,3'-disulfonate-4,4'-difluorobenzophenone represented by the following general formula (G2) was synthesized.

[Chemical Formula 18]

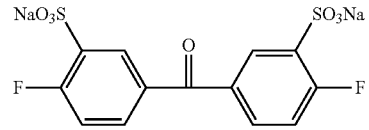

(G2)

In a flask equipped with a stirring blade and a thermometer, 109.1 g of 4,4'-difluorobenzophenone (Aldrich reagent) and 150 mL of fuming sulfuric acid (50% by weight of SO$_3$) (manufactured by Wako Pure Chemical Industries, Ltd.)

were charged and the reaction was carried out at 100° C. for 10 hours. The reaction solution was poured into a large amount of water by several portions and, after neutralizing with NaOH, 200 g of sodium chloride was added, and thus a synthetic product was precipitated. The resulting precipitate was filtered and then recrystallized from an aqueous ethanol solution to obtain disodium 3,3'-disulfonate-4,4'-difluorobenzophenone represented by the above general formula (G2). Purity was 99.3%. The structure was confirmed by $^1$H-NMR. Impurities were quantitatively analyzed by capillary electrophoresis (organic matter) and ion chromatography (inorganic matter).

Example 1

A polymer represented by the following general formula (G3) was synthesized.

[Chemical Formula 19]

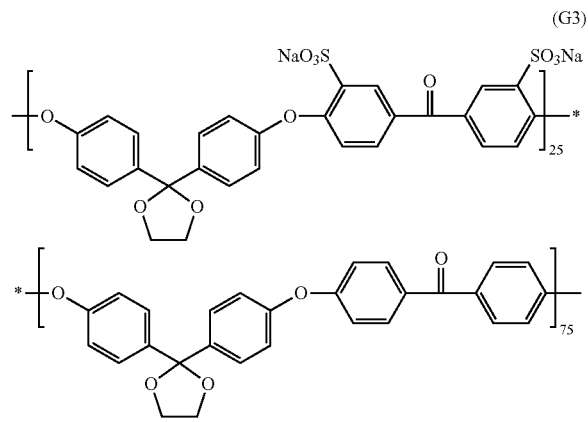

(G3)

3.5 g of potassium carbonate, 5.0 g of a 2,2-bis(4-hydroxyphenyl)-1,3-dioxolane mixture obtained in Synthesis Example 1, 3.3 g of 4,4'-difluorobenzophenone and 2.1 g of disodium 3,3'-disulfonate-4,4'-difluorobenzophenone obtained in Synthesis Example 2 were polymerized in N-methyl pyrrolidone (NMP) at 230° C. The reaction solution was purified by reprecipitating with a large amount of water to obtain a polymer electrolyte precursor represented by the general formula (G3). The resulting polymer electrolyte precursor had a weight average molecular weight of 210,000.

A 25 wt % N-methylpyrrolidone (NMP) solution of the resulting polymer electrolyte precursor was applied and spread over a glass substrate, dried at 100° C. for 4 hours and then subjected to a heat treatment under nitrogen at 300° C. for 10 minutes to obtain a membrane. The polymer electrolyte precursor was excellent in solubility. The resulting membrane was dipped in 6N hydrochloric acid at 95° C. for 24 hours, subjected to proton substitution and deprotection reaction, and then sufficiently washed by dipping in a large excess amount of pure water for 24 hours. In the resulting polymer electrolyte membrane, the density of a sulfonic acid group was 1.2 mmol/g.

The resulting polymer electrolyte membrane had a membrane thickness of 41 μm and proton conductivity A per area of 5.6 S/cm². Dimensional change was scarcely recognized in an aqueous 30 wt % methanol solution at 60° C. and the polymer electrolyte membrane was excellent in resistance to hot methanol. The polymer electrolyte membrane was not dissolved even when dipped in NMP at 100° C. As a result of IR analysis, a peak at 2,960 cm$^{-1}$ disappeared and the presence of a ketal group could not be confirmed.

Example 2

A polymer represented by the following general formula (G4) was synthesized.

[Chemical Formula 20]

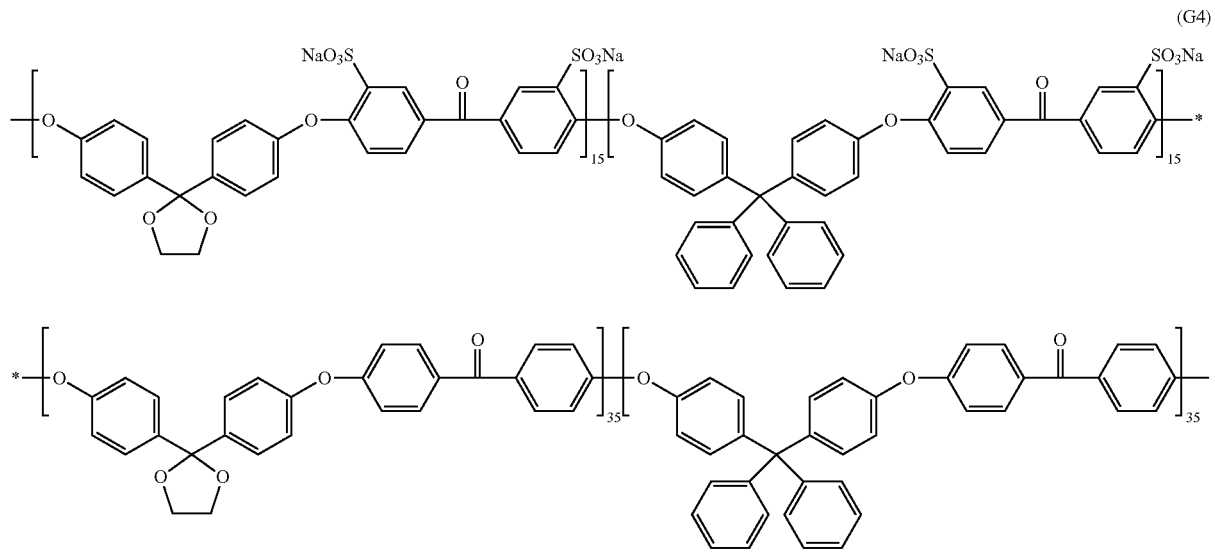

(G4)

wherein the symbol * means that the right end of the upper general formula is bonded with the left end of the lower general formula at the position.

wherein the symbol * means that the right end of the upper general formula is bonded with the left end of the lower general formula at the position.

3.5 g of potassium carbonate, 2.5 g of a 2,2-bis(4-hydroxyphenyl)-1,3-dioxolane mixture obtained in Synthesis Example 1, 3.5 g of 4,4'-dihydroxytetraphenylmethane, 3.1 g of 4,4'-difluorobenzophenone and 2.5 g of disodium 3,3'-disulfonate-4,4'-difluorobenzophenone obtained in Synthesis Example 2 were polymerized in N-methylpyrrolidone (NMP) at 230° C. The reaction solution was purified by reprecipitating with a large amount of water to obtain a polymer electrolyte precursor represented by the general formula (G4). The resulting polymer electrolyte precursor had a weight average molecular weight of 220,000.

In the same manner as in Example 1, except that the polymer electrolyte precursor (G3) was replaced by the polymer electrolyte precursor (G4), a membrane was produced. The polymer electrolyte precursor was excellent in solubility. In the resulting polymer electrolyte membrane, the density of a sulfonic acid group was 1.2 mmol/g.

The resulting polymer electrolyte membrane had a membrane thickness of 43 μm and proton conductivity A per area of 6.2 S/cm². Dimensional change was scarcely recognized in an aqueous 30 wt % methanol solution at 60° C. and the polymer electrolyte membrane was excellent in resistance to hot methanol. The polymer electrolyte membrane was not dissolved even when dipped in NMP at 100° C. As a result of IR analysis, a peak at 2,960 cm$^{-1}$ disappeared and the presence of a ketal group could not be confirmed.

Example 3

In the same manner as in Example 1, except that the conditions of the proton substitution and deprotection reaction were replaced by dipping in 1N hydrochloric acid at 25° C. for 24 hours, a polymer electrolyte membrane was produced.

The resulting polymer electrolyte membrane had a membrane thickness of 40 μm and proton conductivity A per area of 5.3 S/cm². Dimensional change was scarcely recognized in an aqueous 30 wt % methanol solution at 60° C. and the polymer electrolyte membrane was excellent in resistance to hot methanol. The polymer electrolyte membrane was not dissolved even when dipped in NMP at 100° C. As a result of IR analysis, a peak at 2,960 cm$^{-1}$ was slightly recognized and a trace amount of a ketal group could be confirmed.

Example 4

In the same manner as in Example 1, except that 3.3 g of 4,4'-difluorobenzophenone was replaced by 2.6 g and 2.1 g of disodium 3,3'-disulfonate-4,4'-difluorobenzophenone was replaced by 3.4 g, a polymer electrolyte membrane was produced. In the resulting polymer electrolyte membrane, the density of a sulfonic acid group was 1.8 mmol/g.

The resulting polymer electrolyte membrane had a membrane thickness of 50 μm and proton conductivity A per area of 7.7 S/cm². Dimensional change was scarcely recognized in an aqueous 30 wt % methanol solution at 60° C. and the polymer electrolyte membrane was excellent in resistance to hot methanol. The polymer electrolyte membrane was not dissolved even when dipped in NMP at 100° C. As a result of IR analysis, a peak at 2,960 cm$^{-1}$ disappeared and the presence of a ketal group could not be confirmed.

Synthesis Example 3

Synthesis of 2,2-Bis(4-Hydroxyphenyl)-1,3-Dioxolane (K-DHBP) represented by the formula (G1)

In a 3 L flask equipped with a stirring blade made of Teflon® and a thermometer, 4,4'-dihydroxybenzophenone (495 g, DHBP, reagent manufactured by Tokyo Chemical Industry Co., Ltd.) and montmorillonite clay K10 (750 g, Aldrich reagent) were charged, and the atmosphere in the flask was replaced by nitrogen. Then, ethylene glycol (1,200 mL, manufactured by Wako Pure Chemical Industries, Ltd.) and methyl orthoformate (500 mL, manufactured by Wako Pure Chemical Industries, Ltd.) were added. Under stirring, methanol and methyl formate to be produced were reacted with methyl orthoformate while gradually distilling at a bath temperature of 110° C., an inner temperature of 74° C. and a steam temperature of 52° C. for 8 hours. Then, 500 mL of methyl orthoformate was added, followed by the reaction for 8 hours.

The reaction solution was diluted with 1 L of ethyl acetate and clay was removed by filtration. After washing with 500 mL of ethyl acetate three times, a wash liquid was also added. The filtrate was extracted with 1 L of an aqueous 2% NaHCO₃ solution four times, extracted once with 1 L of saturated saline, dried over Na₂SO₄ and then concentrated. To the resulting white slurry solution, 500 mL of dichloromethane was added, followed by filtration and washing with 250 mL of dichloromethane three times. The objective K-DHBP/DHBP mixture was obtained as a pale yellow solid (yield: 347 g, K-DHBP/DHBP=94/6 (mol %)). The structure was confirmed by ¹H-NMR and a ratio K-DHBP/DHBP was calculated. Other impurities were not recognized by gas chromatography.

Example 5

Synthesis of polymer represented by the following general formula (G5)

[Chemical Formula 21]

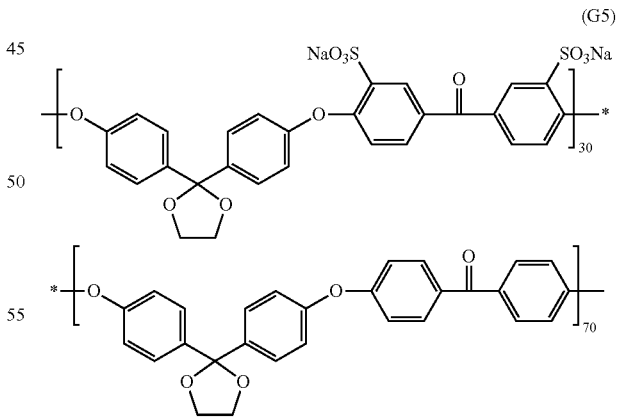

wherein the symbol * means that the right end of the upper general formula is bonded with the left end of the lower general formula at the position, a sulfuric acid group is described in a Na type but includes a case where it is replaced by a K type during the polymerization, and all bisphenol residues are described by a K-DHBP residue but include a DHBP residue.

In a 500 mL three-necked flask equipped with a stirrer, a nitrogen introducing tube and a Dean-Stark trap, 13.82 g (Aldrich reagent, 100 mmol) of potassium carbonate, 20.4 g (80 mmol) of a mixture of K-DHBP and DHBP in a mixing molar ratio of 94/6 obtained in Synthesis Example 3, 12.2 g (Aldrich reagent, 56 mmol) of 4,4'-difluorobenzophenone and 10.1 g (24 mmol) of disodium 3,3'-disulfonate-4,4'-difluorobenzophenone obtained in Synthesis Example 2 were charged and, after the atmosphere in the flask was replaced by nitrogen, 100 mL of N-methyl pyrrolidone (NMP) and 50 mL of toluene were added. After dehydration at 180° C., toluene was removed by heating and polymerization was carried out at 230° C. for 6 hours. The reaction solution was purified by reprecipitating with a large amount of water to obtain a polymer electrolyte precursor represented by the formula (G5). The resulting polymer electrolyte precursor had a weight average molecular weight of 250,000.

With respect to the resulting polymer electrolyte precursor of the formula (G5), quantitative analysis of a substance derived from a ketal group was carried out by the measurement of TPD-MS. As a result, 5.12% by weight of $C_2H_4O$ and 0.41% by weight of 2-methyl-1,3-dioxolane, namely, 5.53% by weight in total of a substance derived from a ketal group was detected at about 250° C.

A 25 wt % N-methylpyrrolidone (NMP) solution of the resulting polymer electrolyte precursor of the formula (G5) was pressure-filtered using a glass fiber filter and then applied and spread over a glass substrate. After drying at 100° C. for 4 hours and heating to 300° C. over 30 minutes under nitrogen, a heat treatment was carried out at 300° C. for 10 minutes to obtain a membrane. The polymer electrolyte precursor was excellent in solubility. The membrane was dipped in 6N hydrochloric acid at 95° C. for 24 hours, subjected to proton substitution and deprotection reaction, dipped in a large excess amount of pure water for 24 hours and then sufficiently washed to obtain a polymer electrolyte membrane.

The evaluation results are summarized in Table 1. As a result of wide angle X-ray diffraction of the resulting polymer electrolyte membrane, no crystalline peak was recognized. The polymer electrolyte membrane was excellent in resistance to solvents and was also excellent in proton conductivity and fuel barrier properties. The polymer electrolyte membrane was not dissolved or collapsed even when dipped in hot water or hot methanol and is a tough membrane, and was also excellent in resistance to hot water and resistance to hot methanol.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

In the resulting polymer electrolyte membrane, molar contents of constituent units represented by the general formulas (Q1) to (Q3) are as follows: X=0.85, Y=0 and Z=0.15, and satisfied the formula (S1). Also, the content of constituent unit represented by the general formulas (Q1) and (Q3) in the polymer was 100% by weight.

Example 6

In the same manner as in Example 5, except that the amount of 4,4'-difluorobenzophenone and that of disodium 3,3'-disulfonate-4,4'-difluorobenzophenone were replaced by 11.3 g (52 mmol) and 11.8 g (28 mmol), a polymer electrolyte precursor and a polymer electrolyte membrane were produced. The resulting polymer electrolyte precursor had a weight average molecular weight of 280,000.

The evaluation results are summarized in Table 1. As a result of wide angle X-ray diffraction of the resulting polymer electrolyte membrane, no crystalline peak was recognized. The polymer electrolyte membrane was a very rigid electrolyte membrane. The polymer electrolyte membrane was excellent in resistance to solvents and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

In the resulting polymer electrolyte membrane, molar contents of constituent units represented by the general formulas (Q1) to (Q3) are as follows: X=0.825, Y=0 and Z=0.175, and satisfied the formula (S1). Also, the content of constituent unit represented by the general formulas (Q1) and (Q3) in the polymer was 100% by weight.

Example 7

In the same manner as in Example 5, except that the amount of 4,4'-difluorobenzophenone and that of disodium 3,3'-disulfonate-4,4'-difluorobenzophenone were replaced by 10.5 g (48 mmol) and 13.5 g (32 mmol), a polymer electrolyte precursor and a polymer electrolyte membrane was produced. The resulting polymer electrolyte precursor had a weight average molecular weight of 230,000.

The evaluation results are summarized in Table 1. As a result of wide angle X-ray diffraction of the resulting polymer electrolyte membrane, no crystalline peak was recognized. The polymer electrolyte membrane was a very rigid electrolyte membrane. The polymer electrolyte membrane was comparatively excellent in resistance to solvents and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

In the resulting polymer electrolyte membrane, molar contents of constituent units represented by the general formulas (Q1) to (Q3) are as follows: X=0.8, Y=0 and Z=0.2, and satisfied the formula (S1). Also, the content of constituent unit represented by the general formulas (Q1) and (Q3) in the polymer was 100% by weight.

Example 8

In the same manner as in Example 5, except that clearance in case of applying and spreading the polymer electrolyte precursor solution over the glass substrate was reduced and the thickness of the electrolyte membrane was reduced, a polymer electrolyte membrane was produced.

The evaluation results are summarized in Table 1. As a result of wide angle X-ray diffraction of the resulting polymer electrolyte membrane, no crystalline peak was recognized. The polymer electrolyte membrane was a tough membrane. The polymer electrolyte membrane was excellent in resistance to solvents, and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Example 9

In the same manner as in Example 6, except that clearance in case of applying and spreading the polymer electrolyte precursor solution over the glass substrate was reduced and the thickness of the electrolyte membrane was reduced, a polymer electrolyte membrane was produced.

The evaluation results are summarized in Table 1. As a result of wide angle X-ray diffraction of the resulting polymer electrolyte membrane, no crystalline peak was recognized. The polymer electrolyte membrane was a very rigid electrolyte membrane. The polymer electrolyte membrane was comparatively excellent in resistance to solvents and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Example 10

In the same manner as in Example 7, except that clearance in case of applying and spreading the polymer electrolyte precursor solution over the glass substrate was reduced and the thickness of the electrolyte membrane was reduced, a polymer electrolyte membrane was produced.

The evaluation results are summarized in Table 1. As a result of wide angle X-ray diffraction of the resulting polymer electrolyte membrane, no crystalline peak was recognized. The polymer electrolyte membrane was a very rigid electrolyte membrane. The polymer electrolyte membrane was comparatively excellent in resistance to solvents and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Example 11

In the same manner as in Example 5, except that the amount of 4,4'-difluorobenzophenone and that of disodium 3,3'-disulfonate-4,4'-difluorobenzophenone] were replaced by 9.6 g (44 mmol) and 15.2 g (36 mmol), a polymer electrolyte precursor and a polymer electrolyte membrane were produced. The resulting polymer electrolyte precursor had a weight average molecular weight of 230,000.

The evaluation results are summarized in Table 1. As a result of wide angle X-ray diffraction of the resulting polymer electrolyte membrane, no crystalline peak was recognized. The polymer electrolyte membrane was a very rigid electrolyte membrane. The polymer electrolyte membrane was comparatively excellent in resistance to solvents and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

In the resulting polymer electrolyte membrane, molar contents of constituent units represented by the general formulas (Q1) to (Q3) are as follows: X=0.775, Y=0 and Z=0.225, and satisfied the formula (S1). Also, the content of constituent unit represented by the general formulas (Q1) and (Q3) in the polymer was 100% by weight.

Example 12

In the same manner as in Example 5, except that the amount of 4,4'-difluorobenzophenone and that of disodium 3,3'-disulfonate-4,4'-difluorobenzophenone were replaced by 8.7 g (40 mmol) and 13.5 g (40 mmol), a polymer electrolyte precursor and a polymer electrolyte membrane was produced. The resulting polymer electrolyte precursor had a weight average molecular weight of 210,000.

The evaluation results are summarized in Table 1. As a result of wide angle X-ray diffraction of the resulting polymer electrolyte membrane, no crystalline peak was recognized. The polymer electrolyte membrane was a very rigid electrolyte membrane. The polymer electrolyte membrane was comparatively excellent in resistance to solvents and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

In the resulting polymer electrolyte membrane, molar contents of constituent units represented by the general formulas (Q1) to (Q3) are as follows: X=0.75, Y=0 and Z=0.25, and satisfied the formula (S1). Also, the content of constituent unit represented by the general formulas (Q1) and (Q3) in the polymer was 100% by weight.

Comparative Example 1

A commercially available NAFION® 117 membrane (manufactured by DuPont Co.) was dipped in a 5% hydrogen peroxide solution at 100° C. for 30 minutes, dipped in 5% dilute sulfuric acid at 100° C. for 30 minutes and then sufficiently washed with deionized water at 100° C.

The evaluation results are summarized in Table 1. Proton conductivity A per area was 5.0 S/cm$^2$. Also, a 20% dimensional change (swelling) was recognized in an aqueous 30 wt % methanol solution at 60° C. The membrane showed high proton conductivity, but was inferior in resistance to hot methanol and fuel barrier properties.

Comparative Example 2

A commercially available NAFION® 117 membrane (manufactured by DuPont Co.) was dipped in a 5% hydrogen peroxide solution at 100° C. for 30 minutes, dipped in 5% dilute sulfuric acid at 100° C. for 30 minutes and then sufficiently washed with deionized water at 100° C.

The evaluation results are summarized in Table 1. The membrane showed high proton conductivity, but was inferior in fuel barrier properties.

Comparative Example 3

10 g of polyetherether ketone (VICTREX®PEEK®, manufactured by VICTREX Co.) was reacted in 100 mL of concentrated sulfuric acid at 25° C. for 20 hours. The reaction solution was gradually poured into a large amount of water to obtain a sulfonated compound of polyetherether ketone. In the resulting polymer, the density of a sulfonic acid group was 2.1 mmol/g. Since the polymer is sulfonated while being dissolved, it was difficult to obtain the position and amount with good reproducibility.

A 25 wt % N-methylpyrrolidone (NMP) solution of the resulting polyetherether ketone sulfonated compound was pressure-filtered using a glass fiber filter, applied and spread over a glass substrate and then dried at 100° C. for 4 hours to obtain a membrane. The polyetherether ketone sulfonated compound was excellent in solubility. The polyetherether ketone sulfonated compound was sufficiently washed by dipping in a large excess amount of pure water for 24 hours to obtain a polymer electrolyte membrane.

The evaluation results are summarized in Table 1. As a result of wide angle X-ray diffraction of the resulting polymer electrolyte membrane, no crystalline peak was recognized. The polymer electrolyte membrane showed comparatively high proton conductivity but was inferior in fuel barrier properties. The polymer electrolyte membrane was collapsed in an aqueous 30 wt % methanol solution at 60° C. and hot water at 95° C., and was inferior in resistance to solvents.

In the resulting polymer electrolyte membrane, molar contents of constituent units represented by the general formulas (Q1) to (Q3) are as follows: X=100, Y=0 and 0=0.25, and does not satisfy the formula (S1). Only a phenylene group interposed between ether bonds was sulfonated.

Comparative Example 4

10 g of a polyether ketone resin (manufactured by VICTREX Co.) was reacted in 100 mL of fuming sulfuric acid at 100° C. for 2 hours. The reaction solution was diluted with concentrated sulfuric acid and then poured into a large amount of water to obtain a sulfonated compound SPEK-2 of polyether ketone. In the resulting SPEK-2, the density of a sulfonic acid group was 1.2 mmol/g.

The polymer SPEK-2 could not be dissolved in N-methyl pyrrolidone (NMP) and it was difficult to form a membrane. The resulting polymer has the composition similar to that of the polymer obtained in Example 5, but was inferior in solubility. Also, the presence of a ketal group could not be confirmed by IR and solid $^{13}$C-CP/MAS spectrum. Various evaluations could not be carried out. Y and Z satisfy the relational expression Y>Z and did not satisfy the formula (S1).

As a result of wide angle X-ray diffraction of the powdered polyether ketone resin, a crystalline peak was recognized and crystallinity was 30%.

Comparative Example 5

In the same manner as in Example 7, except that 20.4 g of a mixture of K-DHBP and DHBP in a mixing molar ratio of 94/6 obtained in Synthesis Example 3 was replaced by 17.1 g (80 mmol) of DHBP, a polyether ketone polymer was polymerized. From the initial stage of the polymerization, a polymer was precipitated and the polymerization was hardly carried out. Because of solvent insolubility, the molecular weight could not be measured. Because of insufficient solubility, a membrane could not be formed and various measurements could not be carried out.

TABLE 1

| | Density of sulfonic acid group (mmol/g) | Thickness (μm) | Proton conductivity B per unit area (S·cm$^{-2}$) | Proton conductivity B per unit area and thickness (mS·cm$^{-1}$) | Methanool crossover per unit area (μmol·min$^{-1}$·cm$^{-2}$) | Methanol crossover per unit area and thickness (nmol·min$^{-1}$·cm$^{-1}$) | Weight loss to NMP (%) | TPD-MS (wt %) | Crystallinity (%) |
|---|---|---|---|---|---|---|---|---|---|
| Example 5 | 1.36 | 36 | 5.2 | 19 | 0.5 | 1.8 | 11 | 0.08 | 0 |
| Example 6 | 1.56 | 40 | 6.8 | 27 | 0.7 | 2.7 | 23 | 0.09 | 0 |
| Example 7 | 1.75 | 48 | 7.7 | 37 | 0.9 | 4.5 | 33 | 0.08 | 0 |
| Example 8 | 1.36 | 25 | 7.2 | 18 | 0.7 | 1.8 | 13 | 0.10 | 0 |
| Example 9 | 1.56 | 32 | 8.1 | 26 | 0.8 | 2.5 | 25 | 0.08 | 0 |
| Example 10 | 1.75 | 31 | 12.6 | 39 | 1.6 | 4.9 | 33 | 0.04 | 0 |
| Example 11 | 1.94 | 30 | 21.3 | 64 | 3.3 | 10 | 49 | 0.05 | 0 |
| Example 12 | 2.12 | 33 | 27.0 | 89 | 5.8 | 19 | 65 | 0.08 | 0 |
| Comparative Example 1 | — | 201 | 5.5 | 111 | 6.8 | 136 | 3 | — | — |
| Comparative Example 2 | — | 23 | 34.8 | 80 | 67.0 | 154 | 5 | — | — |
| Comparative Example 3 | 2.10 | 33 | 33.3 | 110 | 48.5 | 160 | 100 | 0 | 0 |

<Production Example of Electrode>
(1) Electrode for Membrane Electrode Assembly using Aqueous Methanol Solution as Fuel On a carbon cloth "TL-1400W" made of a carbon fiber woven fabric manufactured by E-TEK U.S.A, an anode catalyst coating solution comprising Pt-Ru-supporting carbon catalysts "HiSPEC"® 10000 and "HiSPEC"® 6000 manufactured by Johson&Matthey Co., a polymer electrolyte precursor of the formula (G5) obtained in Example 5 and N-methyl-2-pyrrolidone was applied and then dried to obtain an electrode A. The carbon cloth is coated with a carbon black dispersion solution, and the anode catalyst coating solution was applied on the surface coated with the carbon black dispersion solution. Similarly, on the carbon cloth, a cathode catalyst coating solution comprising a Pt-supporting carbon catalyst TEC10V50E manufactured by Tanaka Kikinzoku Kogyo Co., Ltd., a 20% "NAFION®" solution manufactured by DuPont Co. and n-propanol was applied and then dried to obtain an electrode B.

The amount of the catalyst deposited on the electrode A was adjusted to 2.5 mg/cm$^2$ in terms of platinum (by weight) and the amount of the catalyst deposited on the electrode B was adjusted to 4.5 mg/cm$^2$ in terms of platinum (by weight), respectively.

(2) Electrode for Membrane Electrode Assembly Using Hydrogen as Fuel

To a "NAFION®" solution manufactured by Aldrich Co, a catalyst-supporting carbon (catalyst: Pt, carbon: Valcan XC-72 manufactured by Cabot Co, amount of platinum supported: 50% by weight) was added so as to adjust a weight ratio of platinum to "NAFION®" within a range from 1:0.5, followed by sufficiently stirring to prepare a catalyst-polymer composition. This catalyst-polymer composition was applied to an electrode substrate (carbon paper TGP-H-060 manufactured by Toray Industries, Inc.) subjected preliminarily to a water repellent treatment (impregnated with 20% by weight of PTFE and then fired) and immediately dried to obtain an electrode C. The amount of the catalyst deposited on the electrode C was adjusted to 41.0 mg/cm$^2$ in terms of platinum (by weight)

<Production Example of Low Interface-Resistance Layer Precursor>

10 g of the polymer electrolyte precursor of the formula (G5) obtained in Example 5, 55 g of N-methyl-2-pyrrolidone and 45 g of glycerin were charged in a vessel and heated to 100° C., and then the resulting mixture was stirred until homogeneous to obtain a low interface-resistance layer precursor B.

Example 13

The polymer electrolyte membrane obtained in Example 10 was interposed between two electrodes C2 so as to face with each other, followed by hot pressing under a pressure of 5 MPa at 130° C. for 10 minutes to obtain a membrane electrode assembly. The resulting membrane electrode assembly was assembled into a cell for power generation to obtain a fuel cell.

Power generation characteristics in case of using hydrogen of this fuel cell as a fuel were evaluated. As a result, it a maximum output was 600 mW/cm$^2$.

Example 14

A polymer electrolyte precursor membrane before the deprotection reaction obtained in Example 10 was interposed between an electrode A an electrode so as to face with each other, followed by joining through hot pressing under 3 MPa at 200° C. for 1 minute. The resulting joint body was dipped in 100 g of 6N hydrochloric acid and hated to 80° C., and then the deprotection reaction was carried out for 24 hours to obtain a membrane electrode assembly. The resulting membrane electrode assembly was washed with pure water until the wash becomes neutral and then assembled into a cell for power generation to obtain a fuel cell.

A rate of voltage retention was 96% (an initial voltage is 0.25 V, a voltage after power generation at a constant current for 100 hours is 0.24 V) and the fuel cell exhibited excellent durability.

Even if power generation was continuously evaluated for 2,000 hours, fuel leakage due to breakage of the membrane does not occur and the membrane was excellent in durability.

The methanol crossover of this membrane electrode assembly was 4.5 µmol/cm$^2$/min. An output by passive evaluation was 40 mW/cm$^2$.

Comparative Example 6

A commercially available NAFION® solution (reagent manufactured by Aldrich Co.) was applied on an electrode A and an electrode B and then dried at 100° C. to obtain an electrode with a NAFION® coat. Using "NAFION117®" manufactured by DuPont Co. was used as an electrolyte membrane, the electrode was laminated so as to cover the electrolyte membrane without using a low interface-resistance composition, followed by hot pressing under a pressure of 5 MPa at 130° C. for 30 minutes to obtain a membrane electrode assembly.

The methanol crossover of this membrane electrode assembly was such a large value as 13.0 µmol/cm$^2$/min, a rate of voltage retention was 48%, (an initial voltage is 0.21 V, a voltage after power generation at a constant current for 100 hours is 0.1 V) and the fuel cell was inferior in durability. An output by passive evaluation was such a low value as 10 mW/cm$^2$. After evaluation, the evaluated cell was disassembled and the membrane electrode assembly was visually observed. As a result, peeling was caused by swelling of an aqueous methanol solution at an interface between and anode electrode and an electrolyte membrane, and a portion of the catalyst flowed out after breakage. The electrolyte material used was insufficient in resistance to hot methanol.

Example 15

A low interface-resistance layer precursor B was applied on the electrode A and the electrode B in a coating weight of 3 mg/cm$^2$, followed by a heat treatment at 100° C. for one minute. These electrodes were cut so as to adjust a project area of the electrode to 5 cm$^2$.

Then, these electrodes with the low interface-resistance layer precursor B were laminated polymer electrolyte precursor membrane before the deprotection reaction obtained in Example 10, and they were joined by hot pressing under a pressure of 3 MPa at 100° C. for one minute. Lamination was carried out so that the low interface-resistance layer precursor B faces the membrane side. The resulting joint body was dipped in a solution prepared by adding 10 g of methanol in 90 g of 6N hydrochloric acid and the deprotection reaction was carried out by heating to 80° C. under refluxing for 30 hours to obtain a membrane electrode assembly (extraction of residual solvent and proton exchange). The resulting membrane electrode assembly was washed with pure water until the wash becomes neutral and then assembled into a cell for power generation to obtain a fuel cell.

A rate of voltage retention was 96% (an initial voltage is 0.25 V, a voltage after power generation at a constant current for 100 hours is 0.24 V) and the fuel cell exhibited excellent durability.

Also, a methanol crossover of this membrane electrode assembly was 4.5 µmol/cm$^2$/min. An output by passive evaluation was 40 mW/cm$^2$.

Example 16

The membrane electrode assembly of Example 15, which has an electrode surface of 32 cm$^2$, was produced and then a fuel cell was produced from six membrane electrode assembles using a stack cell as shown in FIG. 1. While circulating an aqueous 10% methanol solution at the anode side using a pump, power generation was carried out. An output of 7 W was obtained.

Example 17

In a 500 mL three-necked flask equipped with a stirrer, a nitrogen introducing tube and a Dean-Stark trap, 13.82 g (Aldrich reagent, 100 mmol) of potassium carbonate, 20.4 g (80 mmol) of a mixture of K-DHBP and DHBP in a mixing molar ratio of 94/6 obtained in Synthesis Example 3, 12.2 g (Aldrich reagent, 56 mmol) of 4,4'-difluorobenzophenone and 10.1 g (24 mmol) of disodium 3,3'-disulfonate-4,4'-difluorobenzophenone obtained in Synthesis Example 2 were charged and, after replacing the atmosphere in the flask by nitrogen, 90 mL of N-methylpyrrolidone (NMP) and 45 mL of toluene were added. After dehydration at 180° C., toluene was removed by heating and polymerization was carried out at 230° C. for 10 hours. The reaction solution was purified by reprecipitating with a large amount of water to obtain a polymer electrolyte precursor represented by the formula (G5). The resulting polymer electrolyte precursor had a weight average molecular weight of 350,000.

With respect to the polymer electrolyte precursor represented by the general formula (G5), quantitative analysis of a substance derived from a ketal group was carried out by the measurement of TPD-MS. As a result, 5.22% by weight of $C_2H_4O$ at about 250° C. and 0.39% by weight of 2-methyl-1,3-dioxolane, that is, 5.61% by weight in total of a substance derived from a ketal group was detected.

A 25 wt % N-methylpyrrolidone (NMP) solution of the resulting polymer electrolyte precursor of the general formula (G5) was pressure-filtered using a glass fiber filter, and then applied and spread over a glass substrate. After drying at 100° C. for 2 hours, the temperature was raised to 300° C. under nitrogen over 30 minutes, followed by a heat treatment at 300° C. for 10 minutes to obtain a membrane. The polymer electrolyte precursor was extremely excellent in solubility. The membrane was dipped in 6N hydrochloric acid at 95° C. for 24 hours, subjected to proton substitution and deprotection reaction and sufficiently washed by dipping in a large excess amount of pure water for 24 hours to obtain a polymer electrolyte membrane.

The evaluation results are summarized in Table 2. In the resulting polymer electrolyte membrane, a crystallization peak was recognized in DSC (first heating stage). Also, as a result of wide angle X-ray diffraction, no crystalline peak was recognized. The resulting polymer electrolyte membrane was a very tough electrolyte membrane. The resulting polymer electrolyte membrane was also excellent in resistance to solvents. Furthermore, the resulting polymer electrolyte membrane was excellent in proton conductivity and fuel barrier properties. Even when dipped in hot water of hot methanol, the resulting polymer electrolyte membrane was neither dissolved nor collapsed and was a tough membrane and was also excellent in resistance to hot water and resistance to hot methanol.

In solid $^{13}$C-CP/MAS spectrum, a peak at a chemical shift of about 65 ppm and a peak at about 110 ppm (attributed to a ketal group), which were recognized in the polyketal ketone membrane before deprotection, were not recognized in the polymer electrolyte membrane after deprotection. This means that the deprotection reaction proceeded in a high conversion rate.

Example 18

In the same manner as in Example 17, except that the amount of 4,4'-difluorobenzophenone and disodium 3,3'-disulfonate-4,4'-difluorobenzophenone were replaced by 11.3 g (52 mmol) and 11.8 g (28 mmol), a polymer electrolyte precursor and a polymer electrolyte membrane were produced. The polymer electrolyte precursor had a weight average molecular weight of 330,000.

The evaluation results are summarized in Table 2. In the resulting polymer electrolyte membrane, a crystallization peak was recognized in DSC (first heating stage). Also, as a result of wide angle X-ray diffraction, no crystalline peak was recognized. The resulting polymer electrolyte membrane was a very tough electrolyte membrane. The resulting polymer electrolyte membrane was also excellent in resistance to solvents. Furthermore, the resulting polymer electrolyte membrane was excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the polyketal ketone membrane before deprotection, were not recognized in the polymer electrolyte membrane after deprotection. This means that the deprotection reaction proceeded in a high conversion rate.

Example 19

In the same manner as in Example 17, except that the amount of 4,4'-difluorobenzophenone and that of disodium 3,3'-disulfonate-4,4'-difluorobenzophenone were replaced by 10.5 g (48 mmol) and 13.5 g (32 mmol), a polymer electrolyte precursor and a polymer electrolyte membrane were produced. The resulting polymer electrolyte precursor had a weight average molecular weight of 280,000.

The evaluation results are summarized in Table 2. As a result of wide angle X-ray diffraction of the resulting polymer electrolyte membrane, no crystalline peak was recognized. The polymer electrolyte membrane was a very rigid electrolyte membrane. The polymer electrolyte membrane was excellent in resistance to solvents and was also excellent in proton conductivity and fuel barrier properties.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Example 20

In the same manner as in Example 17, except that clearance in case of applying and spreading the polymer electrolyte precursor solution over the glass substrate was reduced and the thickness of the electrolyte membrane was reduced, a polymer electrolyte membrane was produced.

The evaluation results are summarized in Table 3. The resulting polymer electrolyte membrane was excellent in tear strength, tensile breaking strength and tensile breaking elongation and was a tough electrolyte membrane. Furthermore, the resulting polymer electrolyte membrane was excellent in proton conductivity.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Using this membrane, a membrane electrode assembly was produced in the same manner as in Example 14. Even if power generation was continuously evaluated for 2,000 hours, fuel leakage due to breakage of the membrane does not occur and the membrane was excellent in durability. After evaluation, the evaluated cell was disassembled and the membrane electrode assembly was visually observed. As a result, breakage of the film was not recognized.

Example 21

In the same manner as in Example 18, except that clearance in case of applying and spreading the polymer electrolyte precursor solution over the glass substrate was reduced and the thickness of the electrolyte membrane was reduced, a polymer electrolyte membrane was produced.

The evaluation results are summarized in Table 3. The resulting polymer electrolyte membrane was excellent in tear strength, tensile breaking strength and tensile breaking elongation and was a tough electrolyte membrane. The resulting polymer electrolyte membrane was also excellent in resistance to solvents. Furthermore, the polymer electrolyte membrane was excellent in proton conductivity.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Example 22

In the same manner as in Example 19, except that clearance in case of applying and spreading the polymer electrolyte precursor solution over the glass substrate was reduced and the thickness of the electrolyte membrane was reduced, a polymer electrolyte membrane was produced.

The evaluation results are summarized in Table 3. The resulting polymer electrolyte membrane was excellent in tear strength, tensile breaking strength and tensile breaking elongation and was a tough electrolyte membrane. Furthermore, the resulting polymer electrolyte membrane was excellent in proton conductivity.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Example 23

In the same manner as in Example 17, except that the amount of 4,4'-difluorobenzophenone and that of disodium 3,3'-disulfonate-4,4'-difluorobenzophenone were replaced by 9.6 g (44 mmol) and 15.2 g (36 mmol), a polymer electrolyte precursor and a polymer electrolyte membrane were produced. The resulting polymer electrolyte precursor had a weight average molecular weight of 250,000.

The evaluation results are summarized in Table 4. In the resulting polymer electrolyte membrane, a crystallization peak was recognized in DSC (first heating stage). Also, as a result of wide angle X-ray diffraction, no crystalline peak was recognized. The resulting polymer electrolyte membrane was excellent in tear strength, tensile breaking strength and tensile breaking elongation and was a very tough electrolyte membrane. The resulting polymer electrolyte membrane was also excellent in resistance to solvents. Furthermore, the polymer electrolyte membrane was excellent in proton conductivity.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Example 24

In the same manner as in Example 17, except that the amount of 4,4'-difluorobenzophenone and that of disodium 3,3'-disulfonate-4,4'-difluorobenzophenone were replaced by 8.7 g (40 mmol) and 13.5 g (40 mmol), a polymer electrolyte precursor and a polymer electrolyte membrane were produced. The resulting polymer electrolyte precursor had a weight average molecular weight of 240,000.

The evaluation results are summarized in Table 4. In the resulting polymer electrolyte membrane, a crystallization peak was recognized in DSC (first heating stage). Also, as a result of wide angle X-ray diffraction, no crystalline peak was recognized. The resulting polymer electrolyte membrane was excellent in tear strength, tensile breaking strength and tensile breaking elongation and was a very tough electrolyte membrane. The resulting polymer electrolyte membrane was also excellent in resistance to solvents. Furthermore, the polymer electrolyte membrane was excellent in proton conductivity.

In solid $^{13}$C-CP/MAS spectrum, a peak at a chemical shift of about 65 ppm and a peak at about 110 ppm (attributed to a ketal group), which were recognized in the membrane before deprotection, were not recognized in the polymer electrolyte membrane after deprotection. This means that the deprotection reaction proceeded in a high conversion rate.

Comparative Example 6

A commercially available NAFION® 117 membrane (manufactured by DuPont Co.) was dipped in a 5% hydrogen peroxide water at 100° C., dipped in 5% dilute sulfuric acid at 100° C. for 30 minutes and then sufficiently washed with deionized water at 100° C.

The evaluation results are summarized in Table 5 and Table 6. In the resulting polymer electrolyte membrane, a crystallization peak was recognized in DSC (first heating stage). Also, as a result of wide angle X-ray diffraction, no crystalline peak was recognized. The resulting polymer electrolyte membrane was excellent in tensile breaking elongation tear strength, but was inferior in tensile breaking strength. Furthermore, the polymer electrolyte membrane showed high proton conductivity, but was inferior in fuel barrier properties.

Comparative Example 7

A commercially available NAFION® 111 membrane (manufactured by DuPont Co.) was dipped in a 5% hydrogen peroxide water at 100° C., dipped in 5% dilute sulfuric acid at 100° C. for 30 minutes and then sufficiently washed with deionized water at 100° C.

The evaluation results are summarized in Table 5 and Table 6. In the resulting polymer electrolyte membrane, a crystallization peak was recognized in DSC (first heating stage). Also, as a result of wide angle X-ray diffraction, no crystalline peak was recognized. The resulting polymer electrolyte membrane was excellent in tensile breaking elongation tear strength, but was inferior in tensile breaking strength. Furthermore, the polymer electrolyte membrane showed high proton conductivity, but was inferior in fuel barrier properties.

Comparative Example 8

10 g of polyetherether ketone VICTREX® PEEK® (manufactured by VICTREX Co.) was reacted in 100 mL of concentrated sulfuric acid at 25° C. for 20 hours. The reaction solution was gradually added in a large amount of water to obtain a sulfonated compound of polyetherether ketone. The density of a sulfonic acid group of the resulting polymer was 2.1 mmol/g. Since the polymer is sulfonated while dissolving, it was difficult to obtain the position and the amount of a sulfonic acid group with good reproducibility.

A 25% wt % N-methylpyrrolidone (NMP) solution of the resulting polyetherether ketone sulfonated compound was press-filtered using a glass fiber filter, applied and spread over a glass substrate and then dried at 100° C. for 4 hours to obtain a membrane. The polyetherether ketone sulfonated compound was excellent in solubility. The compound was sufficiently washed by dipping in a large excess amount of pure water for 24 hour.

The evaluation results are summarized in Table 5 and Table 6. In the resulting polymer electrolyte membrane, a crystallization peak was recognized in DSC (first heating stage). Also, as a result of wide angle X-ray diffraction, no crystalline peak was recognized. Also, as a result of wide angle X-ray diffraction, no crystalline peak was not recognized. The resulting polymer electrolyte membrane showed comparatively high proton conductivity but was inferior in fuel barrier properties. The resulting polymer electrolyte membrane was inferior in resistance to hot water and resistance to hot methanol because it was collapsed in an aqueous 30 wt % methanol solution at 60° C. and hot water at 95° C. Also, the polymer electrolyte membrane was inferior in resistance to solvents. The polymer electrolyte membrane showed comparatively large tensile breaking elongation, but showed small tensile breaking strength and small tear strength.

Using this membrane, a membrane electrode assembly was produced in the same manner as in Example 14 and power generation was evaluated. As a result, a phenomenon of fuel leakage at the cathode side was observed after the operation for 195 hours. After evaluation, the cell was disassembled and the membrane electrode assembly was visually observed. As a result, breakage of the membrane was observed and the membrane was insufficient in durability.

Comparative Example 9

10 g of a polyether ketone resin (VICTREX® PEEK-HT (manufactured by VICTREX Co.) was reacted in 100 mL of fuming sulfuric acid at 100° C. for 2 hours. The reaction solution was diluted with concentrated sulfuric acid and then gradually in a large amount of water to obtain a sulfonated compound SPEK-2 of polyether ketone. In the resulting SPEK-2, the density of a sulfonic acid group was 1.2 mmol/g.

The polymer SPEK-2 could not dissolve in N-methyl pyrrolidone (NMP) and it was difficult to form a membrane. The polymer has the composition similar to that of the polymer of Example 17, but was inferior in solubility. As a result of IR and solid $^{13}$C-CP/MAS spectrum, the presence of a ketal group could not be confirmed. Various evaluations could not be carried out. In the resulting polymer, a crystallization peak was not recognized in DSC (first heating stage).

In the powdered polyether ketone resin, a crystalline peak was recognized as a result of wide angle X-ray diffraction and crystallinity was found to be 30%. No crystallization peak was not recognized in DSC (first heating stage)

Comparative Example 10

In the same manner as in Example 3, except that 20.4 g of a mixture of K-DHBP and DHBP in a mixing molar ratio of 94/6 obtained in Synthesis Example 3 was replaced by 17.1 g (80 mmol) of DHBP, a polyether ketone polymer was polymerized. From the initial stage of the polymerization, a polymer was precipitated and the polymerization was hardly carried out. Because of solvent insolubility, the molecular weight could not be measured. Because of insufficient solubility, a membrane could not be formed and various measurements could not be carried out.

TABLE 2

|  | Density of sulfonic acid group (mmol/g) | Thickness (μm) | Proton conductivity B per unit area (S·cm$^{-2}$) | Proton conductivity B per unit area and thickness (mS·cm$^{-1}$) | Methanool crossover per unit area (μmol·min$^{-1}$·cm$^{-2}$) | Methanol crossover per unit area and thickness (nmol·min$^{-1}$·cm$^{-1}$) |
|---|---|---|---|---|---|---|
| Example 17 | 1.38 | 37 | 5.4 | 20 | 0.5 | 1.9 |
| Example 18 | 1.57 | 38 | 7.4 | 28 | 0.8 | 2.9 |
| Example 19 | 1.76 | 52 | 6.7 | 35 | 0.9 | 4.7 |

|  | Crystallization peak | Crystallization calorie (J/g) | Crystallinity (%) | Weight loss to NMP (%) | TPD-MS (wt %) |
|---|---|---|---|---|---|
| Example 17 | Yes | 32.1 | 0 | 12 | 0.03 |
| Example 18 | Yes | 33.1 | 0 | 24 | 0.06 |
| Example 19 | Yes | 28.0 | 0 | 35 | 0.06 |

TABLE 3

|  | Density of sulfonic acid group (mmol/g) | Thickness (μm) | Proton conductivity B per unit area (S · cm$^{-2}$) | Proton conductivity B per unit area and thickness (mS · cm$^{-1}$) | TPD-MS (wt %) | Elmendorf tearing strength (N/cm) | Tensile breaking strength (MPa) | Tensile breaking elongation (%) | Tensile elastic modulus (GPa) | Tensile yield strength (MPa) |
|---|---|---|---|---|---|---|---|---|---|---|
| Example 20 | 1.38 | 28 | 7.1 | 20 | 0.02 | 156 | 185 | 430 | 2.1 | 69 |
| Example 21 | 1.57 | 30 | 9.0 | 27 | 0.10 | 185 | 165 | 470 | 1.8 | 60 |
| Example 22 | 1.76 | 29 | 13.8 | 40 | 0.05 | 165 | 160 | 350 | 1.7 | 64 |

TABLE 4

|  | Density of sulfonic acid group (mmol/g) | Thickness (μm) | Proton conductivity B per unit area (S · cm$^{-2}$) | Proton conductivity B per unit area and thickness (mS · cm$^{-1}$) | Crystallization peak | Crystallization calorie (J/g) | Crystallinity (%) |
|---|---|---|---|---|---|---|---|
| Example 23 | 1.97 | 35 | 19.4 | 68 | Yes | 27.5 | 0 |
| Example 24 | 2.15 | 37 | 24.9 | 92 | Yes | 23.2 | 0 |

|  | Weight loss to NMP (%) | TPD-MS (wt %) | Elmendorf tearing strength (N/cm) | Tensile breaking strength (MPa) | Tensile breaking elongation (%) | Tensile elastic modulus (GPa) | Tensile yield strength (MPa) |
|---|---|---|---|---|---|---|---|
| Example 23 | 50 | 0.09 | 119 | 130 | 350 | 1.5 | 58 |
| Example 24 | 64 | 0.05 | 88 | 105 | 300 | 1.3 | 57 |

TABLE 5

|  | Density of sulfonic acid group (mmol/g) | Thickness (μm) | Proton conductivity B per unit area (S · cm$^{-2}$) | Proton conductivity B per unit area and thickness (mS · cm$^{-1}$) | Methanool crossover per unit area (μmol · min$^{-1}$ · cm$^{-2}$) | Methanol crossover per unit area and thickness (nmol · min$^{-1}$ · cm$^{-1}$) | Crystallization peak | Crystallization calorie (J/g) |
|---|---|---|---|---|---|---|---|---|
| Comparative Example 6 | — | 201 | 5.5 | 111 | 6.8 | 136 | none | 0 |
| Comparative Example 7 | — | 23 | 34.8 | 80 | 67.0 | 154 | none | 0 |
| Comparative Example 8 | 2.10 | 33 | 33.3 | 110 | 48.5 | 160 | none | 0 |

TABLE 6

|  | Crystallinity (%) | Weight loss to NMP (%) | TPD-MS (wt %) | Elmendorf tearing strength (N/cm) | Tensile breaking strength (MPa) | Tensile breaking elongation (%) | Tensile elastic modulus (GPa) | Tensile yield strength (MPa) |
|---|---|---|---|---|---|---|---|---|
| Comparative Example 6 | 0 | 3 | — | 31 | 55 | 340 | 0.2 | none |
| Comparative Example 7 | 0 | 5 | — | 42 | 51 | 360 | 0.2 | none |
| Comparative Example 8 | 0 | 100 | 0 | 35 | 40 | 180 | 0.7 | 25 |

Synthesis Example 4

In a flask equipped with a stirring blade and a thermometer, montmorillonite clay K10 (150 g) and 99 g of dihydroxybenzophenone were charged and the atmosphere in the flask was replaced by nitrogen. 242 mL of ethylene glycol and 99 mL of methyl orthoformate were added and the reaction was carried out at 110° C. while distilling of by-products produced. After 18 hours, 66 g of methyl orthoformate was added and the reaction was carried out for additional 30 hours, namely, 48 hours in total. The reaction solution was diluted with 300 mL of ethyl acetate added, filtered and then extracted with an aqueous 2% sodium hydrogen carbonate solution four times. The extract solution was concentrated and then recrystallized from dichloroethane to obtain the objective 2,2-bis(4-hydroxyphenyl)-1,3-dioxolane. From gas chromatography, the purity was found to be 99.5%.

Example 25

3.5 g of potassium carbonate, 5.2 g of 2,2-bis(4-hydroxyphenyl)-1,3-dioxolane obtained in Synthesis Example 4, 3.3 g of 4,4'-difluorobenzophenone and 2.1 g of disodium 3,3'- disulfonate-4,4'-difluorobenzophenone obtained in Synthesis Example 2 were polymerized in N-methyl pyrrolidone (NMP) at 190° C. The reaction solution was purified by reprecipitating with a large amount of water to obtain a polymer electrolyte precursor represented by the general formula (G3). The resulting polymer electrolyte precursor had a weight average molecular weight of 230,000.

A 25 wt % N-methylpyrrolidone (NMP) solution of the resulting polymer electrolyte precursor was applied and spread over a glass substrate, dried at 100° C. for 4 hours and then subjected to a heat treatment under nitrogen at 200° C. for 10 minutes to obtain a membrane. The polymer electrolyte precursor was excellent in solubility. The resulting membrane was dipped in 1N hydrochloric acid at 25° C. for 24 hours, subjected to proton substitution and deprotection reaction and then sufficiently washed by dipping in a large amount of pure water for 24 hours.

In the resulting polymer electrolyte membrane, the thickness of the membrane was 41 μm, and proton conductivity A per area was 5.1 S/cm². In an aqueous 30 wt % methanol solution at 60° C., dimensional change was scarcely recognized, and the resulting polymer electrolyte membrane showed high conductivity and was excellent in resistance to hot methanol. As a result of IR, the presence of a ketal group could be confirmed.

Example 26

3.5 g of potassium carbonate, 2.6 g of 2,2-bis(4-hydroxyphenyl)-1,3-dioxolane obtained in Synthesis Example 4, 3.5 g of 4,4'-dihydroxytetraphenylmethane, 3.1 g of 4,4'-difluorobenzophenone and 2.5 g of disodium 3,3'-disulfonate-4,4'-difluorobenzophenone obtained in Synthesis Example 2 were polymerized in N-methylpyrrolidone (NMP) at 190° C. The reaction solution was purified by reprecipitating with a large amount of water to obtain a polymer electrolyte precursor represented by the general formula (G4). The resulting polymer electrolyte precursor had a weight average molecular weight of 240,000.

In the same manner as in Example 25, except that the polymer electrolyte precursor (G3) was replaced by the polymer electrolyte precursor (G4), a polymer electrolyte membrane was produced. The polymer electrolyte precursor was excellent in solubility. In the resulting polymer electrolyte membrane, the thickness of the membrane was 43 μm, and proton conductivity A per area was 5.6 S/cm². In an aqueous 30 wt % methanol solution at 60° C., dimensional change was scarcely recognized, and the resulting polymer electrolyte membrane showed high conductivity and was excellent in resistance to hot methanol. As a result of IR, the presence of a ketal group could be confirmed.

Example 27

In the same manner as in Example 5, except that the conditions of proton substitution and deprotection reaction were replaced by dipping in 1N hydrochloric acid at 25° C. for 24 hours, a polymer electrolyte membrane was produced. In the resulting polymer electrolyte membrane, the thickness of the membrane was 36 μm, and proton conductivity B per area was 6.1 S/cm² per unit area, and 22 mS/cm per unit area and thickness. Methanol crossover was 0.6 μmol/min·cm² per unit area, and 2.3 nmol/min·cm per unit area and thickness.

As a result of wide angle X-ray diffraction of the resulting polymer electrolyte membrane, no crystalline peak was recognized. The polymer electrolyte membrane was also excellent in resistance to solvents. Furthermore, the polymer electrolyte membrane was excellent in proton conductivity and fuel barrier properties. Also, the polymer electrolyte membrane was not dissolved or collapsed even when dipped in hot water or hot methanol and is a tough membrane, and was also excellent in resistance to hot water and resistance to hot methanol.

As a result of quantitative Analysis of a substance derived from a ketal group by the measurement of TPD-MS, 0.36% by weight of the substance derived from a ketal group was detected. In solid $^{13}$C-CP/MAS spectrum, a small amount of a peak at a chemical shift of about 65 ppm and a peak at about 110 ppm (attributed to a ketal group), which were recognized in the membrane before deprotection, was recognized in the polymer electrolyte membrane after deprotection.

INDUSTRIAL APPLICABILITY

The polymer electrolyte material and the polymer electrolyte membrane of the present invention can be applied for various electrochemical apparatus, for example, fuel cell, water electrolysis apparatus and chloroalkali electrolysis apparatus, and are preferably for a fuel cell, particularly preferably for fuel cell, using an aqueous hydrogen or methanol solution as a fuel.

The polymer electrolyte fuel cell of the present invention is preferably used as power supply sources for portable devices such as cellular phone, personal computer, PDA, video cameras, and digital cameras; household appliances such as cordless cleaners; toys; mobile bodies, for example, vehicles such as electric bicycle, motorcycle, automobile, bus, and trucks, marine vessels, and railroads; substitutions of conventional primary and secondary cells, such as stationary type power generator; and combinations of these fuel cells with a hybrid power supply.

The invention claimed is:
1. A polymer electrolyte material comprising:
at least an ionic group-containing polymer containing constituent units represented by the general formulas (Q1) and (Q3) and further comprising a molar content of constituent units represented by the general formulas (Q1), (Q2) and (Q3) in accordance with the following formulas:

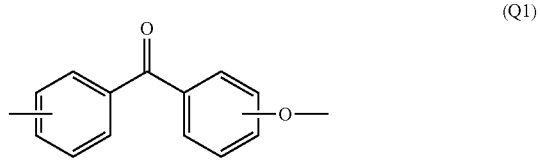

(Q1)

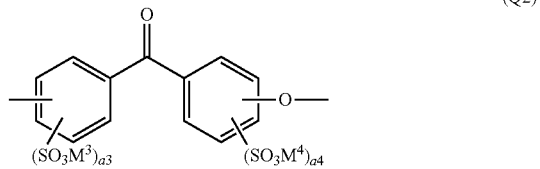

(Q2)

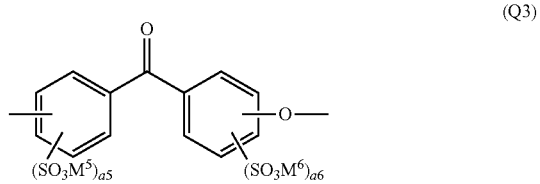

(Q3)

wherein a3 and a4 represent an integer satisfying the following equation: a3+a4=1, a5+a6=2, M3 to M6 represent a cation selected from hydrogen and a metal cation, and $0 \leq Y < Z < X < 1$, wherein Y is 0.1 or less, wherein X, Y and Z represent a molar content of each constituent unit based on a total molar amount of constituent units represented by the general formulas (Q1), (Q2) and (Q3) respectively, and also satisfy the following equation: X+Y+Z=1, and the constituent unit represented by the general formula (Q3) is interposed between the constituent units represented by the general formula (Q1).

2. A polymer electrolyte part comprising the polymer electrolyte material according to claim 1.

3. A membrane electrode assembly comprising the polymer electrolyte material according to claim 1.

4. A polymer electrolyte fuel cell comprising the polymer electrolyte material according to claim 1.

5. A polymer electrolyte membrane comprising the polymer electrolyte material according to claim 1.

* * * * *